United States Patent [19]

[11] 3,718,768

Abramson et al.

[45] Feb. 27, 1973

[54] VOICE OR ANALOG COMMUNICATION SYSTEM EMPLOYING ADAPTIVE ENCODING TECHNIQUES

[75] Inventors: Carl Newton Abramson; Douglas George Jones, both of Somerville, Mark T. Nadir, Warren, all of N.J.

[73] Assignee: Adaptive Technology, Inc., Piscataway, N.J.

[22] Filed: Aug. 9, 1971

[21] Appl. No.: 169,993

[52] U.S. Cl. ..........................179/15 BA, 179/15 AL

[51] Int. Cl. ..................................................H04j 3/04

[58] Field of Search .......179/2 A, 2 AS, 15 Al, 15 A, 179/15 BA, 15 AP, 15 BC, 15 BS, 15 AW, 15 BY

[56] References Cited

UNITED STATES PATENTS

| | | | |
|---|---|---|---|
| 3,646,273 | 2/1972 | Nadir et al. | 179/15 AL |
| 3,646,274 | 2/1972 | Nadir et al. | 179/15 AL |

*Primary Examiner*—Ralph D. Blakeslee
*Attorney*—Kenyon & Kenyon Reilly Carr & Chapin

[57] ABSTRACT

Voice and other analog information are transmitted from one to another of a plurality of stations in a communications system wherein, at the sending stations, an encoder samples the voice or other analog signal for sets of values of one or more characteristics, and assigned codes corresponding to the sampled sets of values are stored in sequence in a buffer. Each of the codes corresponding to the sample characteristics is assigned to respective ones of a multiplicity of discrete subperiods within each of a series of periods (P). Signal identifying receiving stations are inserted at indiscriminate rates on the transmission medium into the available subperiods having assigned meanings corresponding to the stored codes in a manner which removes the stored codes in sequence from the buffer.

Each receiving station detects its own identification signal on the transmission medium and correlates the subperiods in which the identification signals are detected with their respective assigned codes. A decoder converts such correlated codes to their respective assigned sets of sample values from which it reconstructs the original voice or other analog signal.

The system permits different and/or continuously varying sampling rates to be used by the stations without requiring fixed time or frequency channels. Thus, the system is generally insensitive to the kind of analog input signal waveform presented for encoding, or the type of encoding or decoding technique employed.

31 Claims, 13 Drawing Figures

INVENTORS
CARL N. ABRAMSON
DOUGLAS G. JONES
MARK T. NADIR
BY Kenyon & Kenyon Reilly Carr & Chapin
ATTORNEYS INVENTORS
CARL N. ABRAMSON
DOUGLAS G. JONES
MARK T. NADIR
BY
Kenyon & Kenyon Reilly Carr & Chapin
ATTORNEYS INVENTORS
CARL N. ABRAMSON
DOUGLAS G. JONES
MARK T. NADIR
BY
Kenyon & Kenyon Reilly Carr & Chapin
ATTORNEYS INVENTORS
CARL N. ABRAMSON
DOUGLAS G. JONES
MARK T. NADIR
BY Kenyon & Kenyon Reilly Carr & Chapin
ATTORNEYS

RECEPTOR FACING LOGIC

CIRCULATING STORED SI REGISTER

INVENTORS
CARL N. ABRAMSON
DOUGLAS G. JONES
MARK T. NADIR
BY
Kenyon & Kenyon Reilly Carr & Chapin
ATTORNEYS

INVENTORS
CARL N. ABRAMSON
DOUGLAS G. JONES
MARK T. NADIR

BY Kenyon & Kenyon Reilly Carr & Chapin
ATTORNEYS

PATENTED FEB 27 1973 3,718,768

SHEET 7 OF 9

INVENTORS
CARL N. ABRAMSON
DOUGLAS G. JONES
MARK T. NADIR
BY Kenyon & Kenyon Reilly Carr & Chapin
ATTORNEYS INVENTORS
CARL N. ABRAMSON
DOUGLAS G. JONES
MARK T. NADIR
BY
Kenyon & Kenyon Reilly Carr & Chapin
ATTORNEYS

INVENTORS
CARL N. ABRAMSON
DOUGLAS G. JONES
MARK T. NADIR

BY Kenyon & Kenyon Reilly Carr & Chapin

ATTORNEYS

VOICE OR ANALOG COMMUNICATION SYSTEM EMPLOYING ADAPTIVE ENCODING TECHNIQUES

BACKGROUND OF THE INVENTION

1. Field of the Invention

The present invention relates to a system and method of analog encoding and communication, and more particularly, relates to adaptive encoding techniques for transferring voice and other analog information from one station to another in a multi-station communications network.

2. Description of the Prior Art

The communication systems heretofore known for transmitting voice and other analog signals between a sending station and a receiving station commonly utilize pulse modulation for encoding wherein a signal to be transmitted is sampled at a predetermined rate and its instantaneous value at the sampling times is used to modulate a train of pulses. These pulses serve to indicate the sample value by either their variation in amplitude, in the case of pulse amplitude modulation (PAM); variation in time position within the sampling period, in the case of pulse position modulation (PPM); or the variation in the specific code transmitted, as in the case of pulse code modulation (PCM).

Generally, where synchronous time multiplex communication systems employ such pulse modulation systems, both the transmitter and the receiver operate in time phase, all of the transmitters have the same fundamental repetition frequency and multiplexing is accomplished by the time domain interleaving of pulses. In such synchronous systems, a periodic time slot or channel is assigned to each station so that a channel is open and available to its associated station to permit instantaneous transmission of the samples. Such synchronous systems require complex apparatus at the receiver which must operate in synchronism and in phase with the sample on the sending side.

There have recently been proposed pulse modulation systems wherein essentially identical, continuously repeating analog comparing signals are generated at both the sending and the receiving stations with such comparing signals operating in synchronism. At the sending station, the input signals of the stations are compared with the generated comparing signal and a code or pulse is transmitted through the communications line at the moment when the instantaneous value of the sample input signal is equal to the value of the comparing signal. At the receiving station, the amplitude value of the input signal sample is derived from the time position of the code or pulse within the sampling period. In the U. S. Pat. No. 3,158,691, issued on Nov. 24, 1964, to Barrie Brightman, there is disclosed a pulse modulation system wherein time division multiplex techniques are employed. Such techniques inherently result in channel idle time during periods of inactivity. In the U.S. Pat. No. 3,422,226, issued on Jan. 14, 1969, to Erno Acs, there is disclosed an address-coded pulse modulation system wherein the address of the intended receiving station is the code transmitted through the communications line when the instantaneous value of the input signal and the comparing voltage are equal. This address-coded pulse modulation system is synchronous in that both the sending and receiving stations must maintain synchronization of their comparing voltage generators. Furthermore, the several sending stations operate in synchronism with the same comparing signal and, since any or all of these stations transmit address codes on an instantaneous basis at the time that a match occurs between the amplitudes of the respective input signals and the comparing signal, then address-overwrite is probable wherein the address codes sent by two or more stations are interleaved or written on top of each other. Generally, the number of errors caused by address-overwrite increases rapidly with an increase in the number of sending stations and the consequent increase in system loading. As a result, the quality of the transmitted voice or analog signal degradates rapidly during times of critical loading.

In addition, the known address-coded pulse modulation system is sensitive to the type of input analog signals because such system operates with a continuously repeating analog comparing signal generator providing a fixed signal waveform. The amplitude and frequency characteristics of the comparing signal establishes a fixed amplitude distribution which should be built up in a way that the address transmission by the stations takes place uniformly during the sampling period. Depending on the statistical distribution of the input signals, non-uniform address transmission can occur resulting in address-overwrite. Thus, this address-coded pulse modulation system effectively limits each station to using the same fixed comparing signal, regardless of the amplitude distributions of the various input signals.

Furthermore, the known address-coded pulse modulation system is sensitive to noise content and phase distortion of the system which directly affect the reproduction accuracy of the analog signal. That is, because of the time-dependent nature of the analog system, time phase distortion of the transmitted samples can produce large amplitude errors in the reconstructed samples.

SUMMARY OF THE INVENTION

It is an object to provide a voice or analog communication system which is insensitive to the kind of analog signals presented for transmission at the sending stations.

It is another object to provide a voice or other analog signal communication system which indiscriminately accommodates different sampling rates used by the stations, where each station's sampling rate can vary on a continuous basis.

It is another object to provide a voice or other analog communication system which is insensitive to transmission induced line phase, frequency and amplitude distortion.

It is another object of the present invention to provide a voice and other analog signal communication system which accommodates peak demands for line access by a plurality of stations and, during times of critical loading, the quality of the transmitted voice or analog signal degradates slowly, as opposed to rapid degradation of quality or system collapse.

It is another object to provide voice or other analog communication systems wherein, during times of critical loading, the system does not close down or lock out completely to any station nor does the system require a station to wait until a large block of information can be transmitted by the station.

It is another object to provide a voice or other analog signal communication system which simultaneously accommodates a large number of stations operating either in groups or singly along a transmission line, without time or frequency dedicated channels interconnecting the stations.

It is a further object to provide a voice or other analog signal communication system wherein the system capacity is distributed in a manner whereby the several sending stations produce no overlapping of data.

These and other objects, which will become apparent from the detailed disclosure and claims to follow, are achieved by the present invention which provides a method and system for transferring voice and other analog information from one to another of a plurality of stations in a multi-station communications network. At the sending stations, an encoder samples the voice or other analog signals for sets of values of one or more characteristics, and assigned number codes corresponding to such sampled sets of values are stored in sequence in a buffer. Each of the number codes is in turn assigned to respective ones of a multiplicity of discrete subperiods within each of a series of periods (P). Signals identifying receiving stations are inserted at indiscriminate rates on the transmission medium into the available subperiods corresponding to the stored codes in a manner which removes the stored codes in sequence from the buffer. In this fashion, a sampled characteristic of an input analog signal is transmitted by storing the number code corresponding to such sampled characteristic, and then inserting an identification signal into the subperiod assigned to the stored number code. A known number of subperiods constitute each of the repeating periods (P).

Each receiving station detects its own identification signal on the transmission medium and correlates the subperiods in which the identification signals are detected with their respective number codes. A decoder converts such number codes to their respective assigned sets of sample values from which it reconstructs the original voice or other analog signal.

The system permits different and/or continuously varying rates to be used by the stations without requiring fixed time or frequency channels. Thus, the system is insensitive to the kind of analog input signal waveform presented for transmission.

It is to be understood that, as used herein, the term "-period (P)" is intended to mean some known number of clock counts. Each period (P) is constituted by a known number of subperiods, station identification periods (SIPs), having a known number of clock counts.

It is also to be understood that, as used herein, the term "clock counts" is intended to mean events which can be time independent, such as clock pulses or signals. In this connection, it is noted that the system of this invention need nor operate off a standard coherent clock or oscillator producing uniformly time-spaced clock signals, but also could operate off of a noise source which produces clock signals or pulses at random time intervals.

It is also to be understood that, as used herein, the term "sync" circuits is intended to include the counting circuits which allow all functional units of the system to operate from the same reference point. It includes the clock for producing the clock counts. Also, the term "synchronously related" as used herein does not mean that there is necessarily an exact simultaneity of events at the stations since delays in the system will cause delays as between those events. It does, however, mean that there will be simultaneity at any station in the system as between a SI and the SIP in which the SI must occur.

It is also to be understood that, as used herein, the term "text interval portion" of the period (P) is intended to mean that portion comprising a plurality of consecutive subperiods which are individually assigned with code numbers corresponding to values of sampled characteristics of the analog input signal. The text interval portion of the period (P) is also used for HANDSHAKING purposes, the details of this operation being more fully disclosed below.

It is also to be understood that, as used herein, the term "START OF PERIOD IDENTIFIER" or "SOPI" of the period (P) is intended to mean that portion for communicating system control information, such as sync signals.

DESCRIPTION OF THE PREFERRED EMBODIMENTS

Figure 1A:
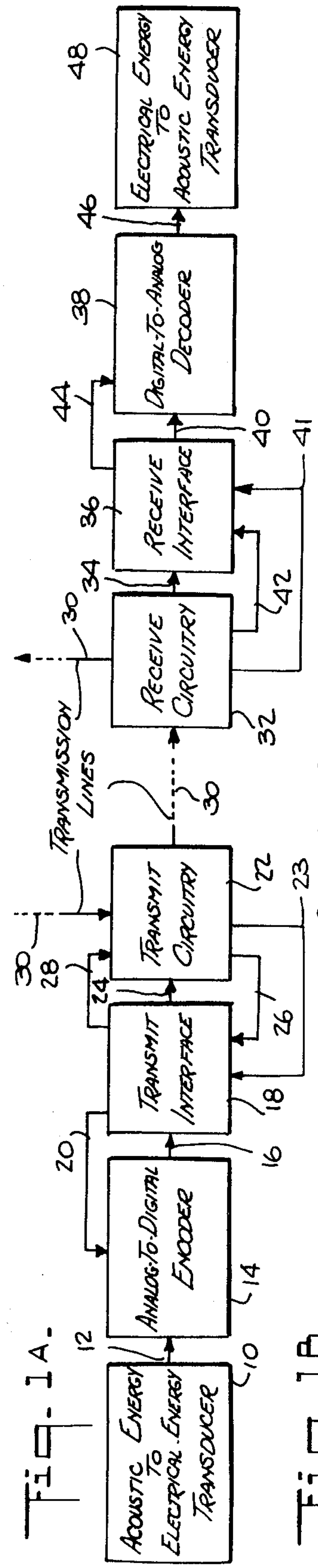
FIG. 1A shows a simplified functional block diagram of the transmitting portion of one station and the receiving portion of another station in a voice or analog communications system illustrative of the present invention.

FIG. 1A is a simplified functional block diagram of the transmitting portion of one station and the receiving portion of another station in a voice communications system illustrative of the system. The system generally includes an Acoustic Energy to Electrical Energy Transducer 10, such as a microphone, which converts voice energy into an analog electrical signal. The analog voice signal is continuously presented along line 12 to an Analog-to-Digital Encoder 14 that converts the analog signal into digital code numbers and presents them over lines 16 to a Transmit Interface 18. The Analog-to-Digital Encoder 14 includes, in one embodiment, a sample and hold circuit (not shown) which is responsive to timing and other control signals on line 20 from the Transmit Interface 18. The signals on line 20 serve to control the sampling rate of the Encoder 14, whether such rate be fixed or varying from time to time in accordance with the complexity of the voice or analog signal, as will become clear from the description below. The Transmit Interface 18 receives timing signals from the Transmit Circuitry 22 via line 23. The Encoder 14 also includes an Analog-to-Digital converter (not shown) which translates the voice or other analog samples into their respective digital code numbers assigned to the various sample characteristics. These digital code numbers are presented in sequence to the Transmit Interface 18 via line 16. Transmit Interface 18 includes a buffer (not shown) which receives and stores the digital code numbers, and presents such code numbers in sequence to Transmit Circuitry 22 via line 24 to be conveyed as if such code numbers were voice data characters.

As will become clear from the description to follow, the exact time of transmitting a code number, corresponding to its assigned voice sample characteristic, is not known in advance as it is not transmitted at a fixed or predetermined rate. The Transmit Circuitry 22 provides a Load Enable signal on line 26 to the Transmit Interface 18 to indicate that the code number being presented by the Transmit Interface 18 on line 24 has been sent and that a new character may now be presented for transmission. Similarly, when Transmit Interface 18 is presenting a new code number, it provides a Transmit Enable signal on line 28 to the Transmit Circuitry 22 to indicate that a new character is being presented for transmission.

Referring again to FIG. 1A, voice communication is accomplished by converting acoustic energy into electrical energy and sampling the electrical signal at an appropriately high rate to assure suitable voice quality. Each sampled character is correlated with one of a set of discrete levels, such as amplitude levels to which code numbers are assigned. These code numbers corresponding to the sampled sets of values are presented by the Encoder 14 to the Transmit Interface 18 where they are stored in sequence in a buffer. Each of the code numbers is in turn assigned to respective ones of a multiplicity of discrete subperiods within each of a series of periods (P). The Transmit Circuitry 22 inserts signals identifying the receiving station at indiscriminate rates on the transmission medium into the available subperiods corresponding to the code numbers presented on line 24 in a manner which removes the stored code numbers in sequence from the buffer located in Transmit Interface 18. Samples are transmitted in the order sampled, but the time period lapsing between successive transmissions of samples varies in accordance with available subperiods corresponding to the stored code numbers.

Receive Circuitry 32 at each station detects its own identification code on the transmission line 30, determines the subperiod count position in which the identification code is detected, and correlates the subperiod position with its assigned code number. The derived code number is presented on line 34 to a Receive Interface 36 where it is stored in sequence in a buffer (not shown). The stored code numbers are presented in sequence to Digital-to-Analog Decoder 38 via line 40. Decoder 38 converts the code numbers to their respective assigned sets of sample values from which it reconstructs the original voice signal.

At the receiver station, a Store Enable signal is provided on line 42 from the Receive Circuitry 32 to the Receive Interface 36 for the purpose of indicating the presence of a received identification signal on the transmission line 30. Receive Circuitry 32 provides timing signals to the Receive Interface 36 via line 41. Also, the code numbers removed from the Receive Interface 36 are converted to their respective sample values and reconstructed in the Decoder 38 at the same rate as the original sampling rate from which they were derived in Encoder 14 so that the original electrical signal energy waveform can be accurately reconstructed. For this purpose, timing or control information is provided on line 44 to the Decoder 38. The reconstructed electrical signal energy waveform is applied via line 46 to Electrical Energy-to-Acoustic Energy Transducer 48 where it is converted back to the voice energy.

Figure 1B:
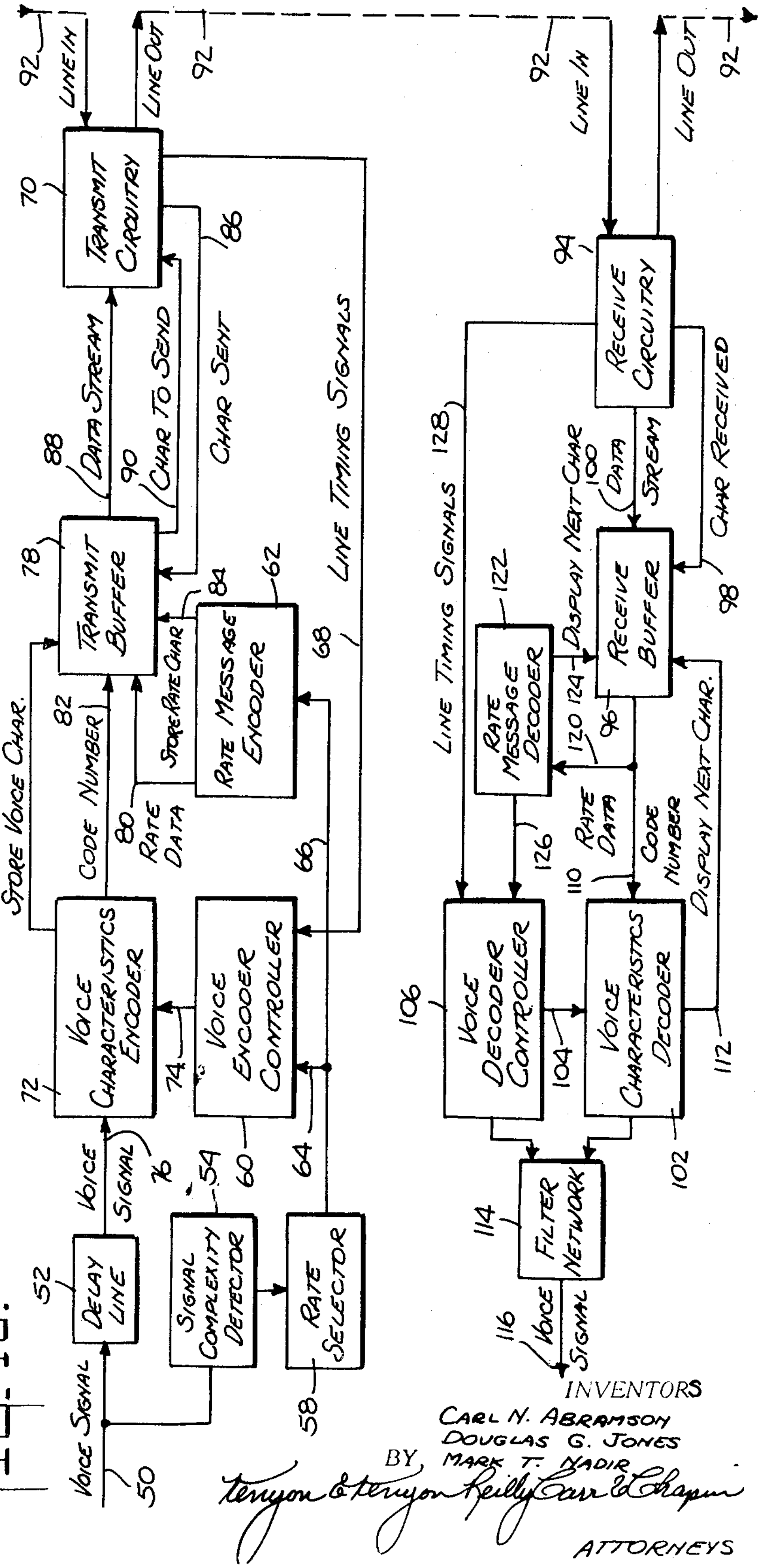
FIG. 1B shows a more detailed functional block diagram of the respective transmitting and receiving portions of stations employing complexity adaptive encoding in the communications system, illustrative of the invention.

FIG. 1B shows a circuit block diagram of a system generally similar to that shown in FIG. 1A, but including complexity adaptive encoding circuitry which provides for changes in the sampling rates of one or more stations in accordance with the complexity of the voice or other analog signal to be transmitted. In this embodiment, a pulse code modulation (PCM) system will be described. It should be understood, however, that any periodic encoder and encoder could be selected instead, such as a delta modulation encoder, a slope encoder, a predictive encoder, or any other encoder that digitalizes one or a group of characteristics defining the voice or analog signal. Thus, FIG. 1B shows a transmitter portion and a receiver portion, respectively, of a PCM complexity adaptive voice communication station.

To accurately represent the encoded characteristics, the encoding rate of any periodic encoder must be suitably high with respect to the rate at which the encoded characteristics change. For example, in a PCM system the encoding rate (or sampling rate) should be at least twice the highest frequency component in the analog or voice signal. Accordingly, the present invention detects the rate at which the characteristics to the encoded change before it is encoded and selects the lowest encoding rate that will enable reconstruction of the characteristics at a receiver. Any change in the encoding rate is communicated to the receiver by a manner to be explained hereinbelow.

Referring again to FIG. 1B, the voice signal present on line 50 is continuously fed into a time delaying device, such as an ordinary delay on line 52, and simultaneously applied to the input terminal of a Signal Complexity Detector 54, such as a frequency spectrum analyzer in a PCM system. A signal on line 56 continuously represents the complexity of the voice signal. For example, in a PCM system, the signal might continuously indicate the highest significant frequency component in the input. A Rate Selector 58 successively monitors segments of the complexity signal on line 56 and after each segment selects an encoding rate that is high enough to suitably encode the voice signals in the segment being monitored. When the selected encoding rate is not the same as the one selected for the previous segment, the device 58 signals this new rate to a Voice Encoder Controller 60 and a Rate Message Encoder 62 along lines 64 and 66, respectively.

The Voice Encoder Controller 60 translates the rate command signal received on line 64 into a series of triggering signals occurring periodically at the commanded rate. Line timing signals available on lines 68 from Transmit Circuitry 70 are used for synchronization and for a rate base from which to generate the triggering signals. The triggering signals are applied to and control the encoding rate of a Voice Characteristics Encoder 72 through line 74.

Time Delay Device 52 is selected to have approximately the same time delay as the period during which the Rate Selector 58 monitors the complexity signal before selecting a possibly new encoding rate. In other words, a change in rate command signal results in a changed encoding rate at a time just prior to the time the first part of the voice signal segment corresponding to the complexity signal segment upon which the change in encoding rate was made leaves the Time Delay Device on line 76 and is applied to the Voice Characteristics Encoder 72. Consequently, each voice signal segment is encoded at the rate selected as suitable for that segment by the Rate Selector 58. Depending upon system requirements and encoder or analog signal characteristics, the length of the time delay device and the complexity signal segment could obviously be varied together in any desirable manner being controlled by any desirable criterion including the latest encoding rate selection.

In response to the rate command signal received on line 66, the Rate Encoder 62 inserts a coded message into Transmit Buffer 78 via line 80 indicating that a new encoding rate has been established and the value of that new rate. Rate Encoder 62 is timed to insert the message into Transmit Buffer 78 before the rate actually changes, for example, after the last piece of data encoded at the old rate has been entered in the buffer over line 82 and before the first piece of data encoded at the new rate seeks to be entered into the buffer. A Store Rate Character command signal is applied to the buffer 78 via line 84. Obviously, the particular position of the rate change message in the buffer with respect to the first data encoded at the new rate is not critical so long as it precedes the first data encoded at the new rate and the receiver knows how many characters, if any, will follow it at the old incoding rate.

The rate change message must be distinguishable by a receiver from ordinary encoded voice data. This can be accomplished by providing a control portion of the period (P) which includes one or several SIPs assigned to this function; that is, the message meanings of these SIPs represent encoding rate change meanings. Rate Encoder 62 then merely selects the appropriate code number corresponding to the desired encoding rate and places it in the buffer 78 resulting eventually in the insertion of the receiver's SI into the special control SIP corresponding to the stored code number.

An alternate approach establishes a control mode during which encoding rate messages or other control messages can be communicated using the text SIPs which ordinarily carry voice sample meanings. That is, a new set of meanings (control meanings) is established for the text SIPs during the control mode. Entry into this mode might be prearranged on a periodic basis either for the whole system or separately for each individual communication. For example, every 10th period (P) could be treated as a control mode period. Entry into the control mode could also be controlled by the transmitter itself. For example, one or more special SIPs in the control portion of the period (P) might be assigned a meaning, such as SWITCH TO CONTROL MODE FOR NEXT CHARACTER ONLY, so that a receiver would switch to control mode when receiving its SI in one of these SIPs and remain in this mode for the next code number (data character) only. The next data character for this receiver would be the encoding rate message.

Loss of voice data can be minimized by designing a buffer 78 having a depth chosen by considering such factors as the maximum tolerated jump in encoding rate or the range of tolerated encoding rates if there is no limitation placed upon changes in encoding rate.

The interconnections between the Transmit Buffer 78 and the Transmit Circuitry 70 are similar to those interconnections shown and described with reference to the Transmit Interface 18 and the Transmit Circuitry 22 shown in FIG. 1A. More particularly, the Transmit Circuitry 70 provides a Load Enable signal on line 86 to the Transmit Buffer 78 to indicate that the code number being presented by the Transmit Buffer 78 on line 88 has been sent and that a new character may now be presented for transmission. Similarly, when the Transmit Buffer 78 is presenting a new code number, it provides a Transmit Enable signal on line 90 to indicate that a new character is being presented by the buffer for transmission.

As mentioned previously, the actual explicit code numbers stored in the Transmit Buffer 78, and corresponding to the sampled sets of values, are not directly inserted on the transmission line 92. That is, each of the code numbers is assigned to respective ones of a multiplicity of discrete subperiods within each of a series of periods (P). The Transmit Circuitry 70 inserts signals identifying the receiving station at indiscriminate rates on the transmission line 92 into those available subperiods having meanings corresponding to the code numbers presented on line 88 in a manner which removes the stored code numbers in sequence from the Transmit Buffer 78. In this manner, the voice sample data is transmitted in the form of an identification signal inserted in a particular subperiod having the original sample meaning associated therewith. These voice samples are transmitted in the order sampled, but the time period lapsing between successive transmissions of samples varies in accordance with the available subperiods corresponding to the stored code numbers.

Referring again to FIG. 1B, Receive Circuitry 94 operates as previously described in connection with FIG. 1A by detecting its own identification signal (SI) on the line 92 and also the SIP count number in which such SI is received. Upon each such detection, the Receive Circuitry 94 signals Receive Buffer 96 via lines 98 to store the code number presented on line 100. A PCM system Voice Characteristics Decoder 102, upon receiving a trigger signal on line 104 from Voice Decoder Controller 106, displays and holds at its output line 108 the decoded sample value of the code number displayed by Receive Buffer 96 over lines 110, thereafter signaling the Receive Buffer 96 over line 112 to discard the decoded character and to display the next character. Voice Decoder Controller 106 accordingly controls the decoding rate.

A Filtering Network 114 normally smooths the abruptly changing analog signal received on line 108 from Voice Characteristics Decoder 102 to produce a smooth analog or voice signal on line 116. If the possible range of decoding rates is large, Filtering Network 114 can be provided with a variable time constant response to step changes in the value of the Decoder Output 108, the time constant being varied directly with the length of time between decoding trigger signals occurring on line 104. The time constant may be conveniently controlled by the Voice Decoder Controller 102 over line 118, as shown.

Encoding rate messages are detected and received over lines 120 by Rate Message Decoder 122, which then signals Receive Buffer 96 via line 124 to discard the rate message character before it is decoded by Decoder 102 as a voice data character. Rate Message Decoder 122 transforms a received Rate Message into a corresponding rate command signal communicated over line 126 to the Voice Decoder Controller 106. Controller 126 is responsive to the rate command signal to generate triggering signals on line 104 that control the decoding rate of the Voice Characteristics Decoder 102 at the communicated rate. Controller 106 also selects a corresponding time constant for the Filtering Network 114 via lines 118 as previously mentioned. Line timing signals available on line 128 from the Receive Circuitry 94 are used by the Controller 106 as a rate base from which to generate the triggering signals at precisely the same rate that was used for encoding. That is, rates established by the Voice Encoder Controller 60 are communicated in the Rate Message and duplicated by the Voice Decoder Controller 106 as specific multiples of the line Period (P) rate.

Figure 2:
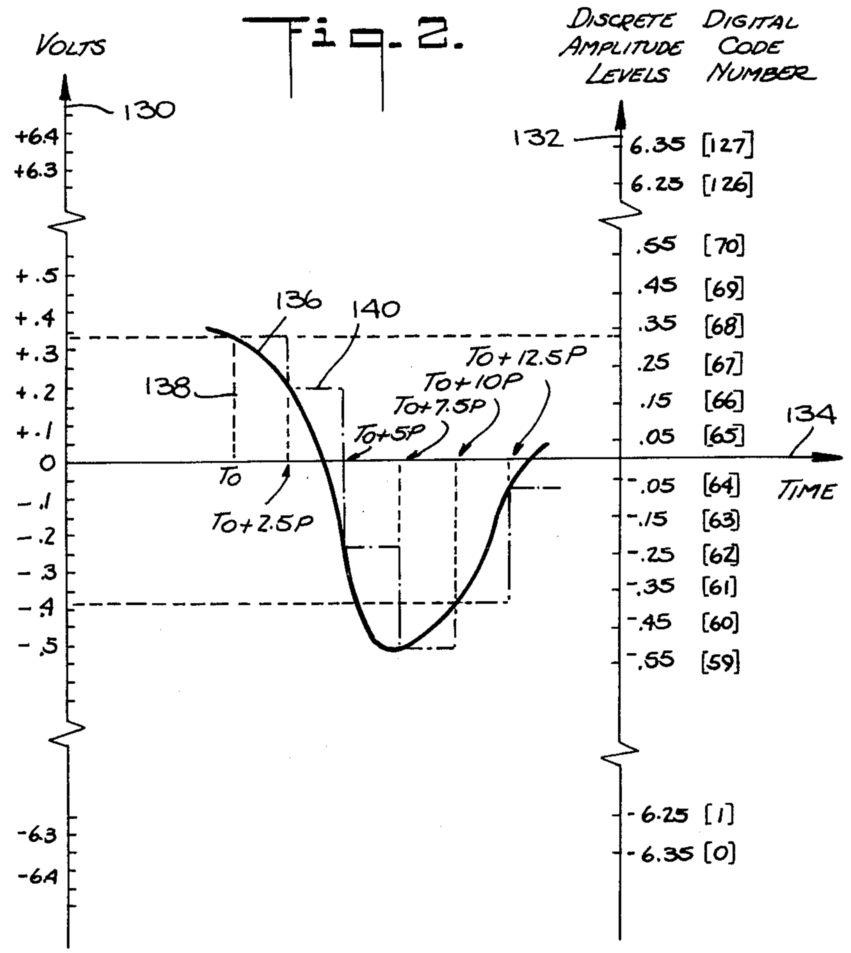
FIG. 2 shows a graph drawn to illustrate one method of encoding an analog signal to produce discrete amplitude levels from which digital code numbers are assigned.

FIG. 2 illustrates the general operation of one analog-to-digital encoding technique employed in the system of the invention. Here, the ordinate axis 130 represents the voltage scale for the analog signal being sampled in the Analog-to-Digital Encoder 14, shown in FIG. 1A. Ordinate axis 132 indicates the voltage scale for the 128 discrete amplitude levels by which a voice signal is represented. Abscissa axis 134 represents the time scale for the analog signal being sampled. The analog signal sampled by the Analog-to-Digital Encoder 14 is represented by the continuous curve 136. The time axis 134 is measured in sample times of 2 ½ periods (P) each starting with arbitrary time $T_0$. Each dotted vertical line 138 represents the time of occurrence of a sample time trigger signal on line 20 shown in FIG. 1A, and each dotted horizontal line 140 represents the amplitude level sample taken at the sample times.

The number of discrete amplitude levels needed to represent an analog signal digitally depends upon the anticipated amplitude range of the signal and the accuracy required in reproducing it. Those in the field generally recognize that an average speech waveform can be reproduced from 128 discrete amplitude levels with an error that is usually less than that detectable by the average ear. The number 128 was chosen rather than a number slightly higher or lower because it is equal to $2^7$ meaning that it can be handled and processed by digital equipment as seven binary bits.

The 128 discrete amplitude levels representing the voice characteristics are indicated by the line 132. Each level is set at 0.1 volt increments, ranging from −6.35 volts to +6.35 volts. The Analog-to-Digital Encoder 14 selects the discrete level within this group that is closest to sampled voltage and represents the selection as a corresponding digital code number indicated within brackets.

The first sample shown in FIG. 2 has a level of approximately 0.33 volts. The Encoder 14 selects the code number 68 since this number corresponds to the discrete amplitude level closest to 0.33 volts, which is 0.35 volts. The digital equivalent of the code number 68 is then placed in the buffer in Transmit Interface 18. Succeeding samples are similarly converted and stored in the Transmit Interface 18.

Obviously, one or more gain or attenuation stage(s) may be employed in the Encoder 14 in order to assure that voice levels corresponding to digital numbers higher than 127 or lower than O do not ordinarily occur.

It should be understood that these gain or attentuation stage(s) may be amplitude dependent resulting in dynamic range compressing or expansion. In effect, such a stage would alter the assignment of discrete amplitude levels by making the amplitude difference between two adjacent levels depend upon the particular level. This effect could, of course, be accomplished directly within the Analog-to-Digital Encoder 14 during the correlation process by appropriately selecting the discrete amplitude levels. For example, the difference between adjacent levels could be increased each time by 0.01 volt as the absolute value increases resulting in the following assignments: [65] is assigned to 0.01 volts; [66] to 0.03 volts; [67] to 0.06 volts; [68] to 0.10 volts; [69] to 0.15 volts; [70] to 0.21 volts; and so forth up to digital code number 127 being assigned to +20.16 volts and digital code number 0 being assigned to −20.16 volts. Obviously, to reduce audible distortion within a maximum range of voice volumes, the assignment of discrete amplitude levels should match normal ear sensitivity which varies logarithmically rather than linearly. For ease of understanding, however, without loss of generality, a linear assignment of levels is assumed.

Figure 3:
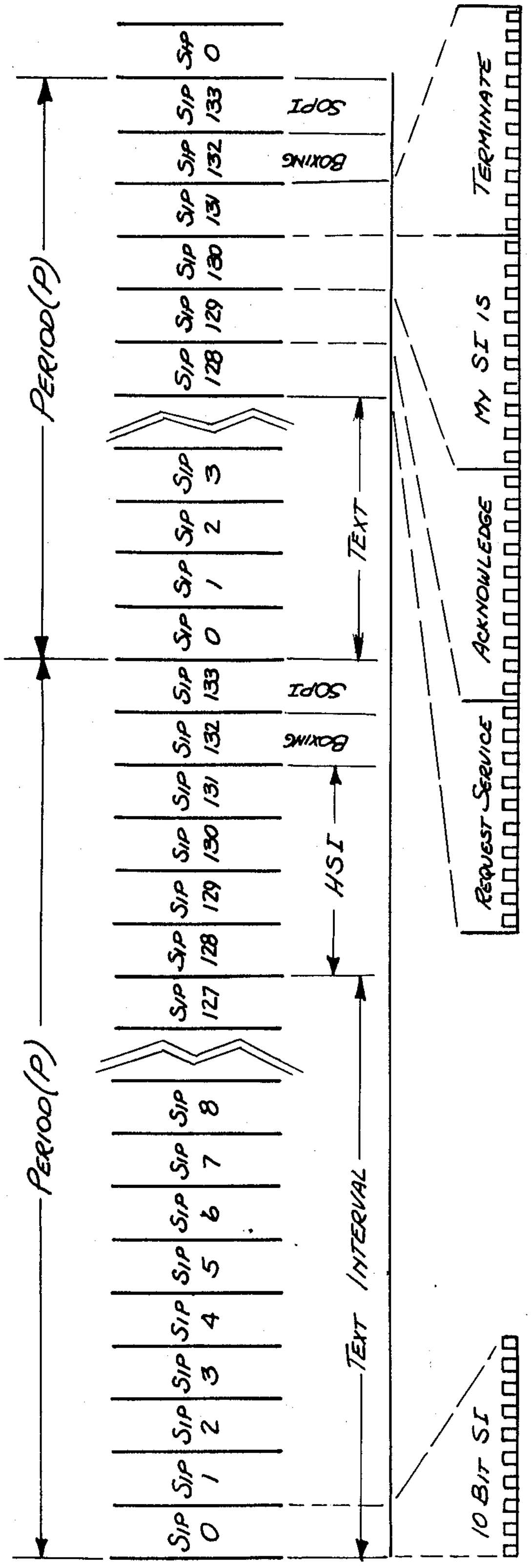
FIG. 3 shows the sequence relationships essential to an understanding of the concepts of the invention and the apparatus for implementing the invention.

Referring to FIG. 3, there is shown the sequence relationships essential to an understanding of the concepts of the invention and the apparatus for implementing it. FIG. 3 illustrates two of a plurality of successive periods (P). The periods (P) are subdivided into a number, such as 134, of station identification periods (SIPs). Here a SIP is shown as constituted by 10 bits. Each period includes a text section comprising 128 SIPs, indicated by the SIP numerals 0–127, a HANDSHAKING section indicated by the numerals 128 – 131, and the system behavior section comprising a BOXING SIP 132 and a SOPI 133. A detailed explanation of the general HANDSHAKING operation and apparatus is disclosed in a copending Pat. application Ser. No. 861,947, filed on Sept. 29, 1969, by Mark T. Nadir and Carl N. Abramson. A detailed explanation of a system employing a BOXING operation is disclosed in a copending Pat. application Ser. No. 48,096, filed on June 22, 1970, by Mark T. Nadir and Carl N. Abramson. The SOPI SIP includes a sync code which provides a reference point for the counting circuits of the system. As discussed above, the 128 SIPs in the text interval of the period (P) are individually assigned to each of the voice sample code numbers. It is noted that each station need not operate with the same subperiod assignments for any set of code numbers. However, two or more communicating stations do operate with the same subperiod assignments for any given communication, in order to permit accurate decoding of the transmitted voice sample information. A technique for implementing the use of different and varying subperiod meaning assignments to the sample code numbers will be discussed below in connection with Z-circuits.

Figure 4:
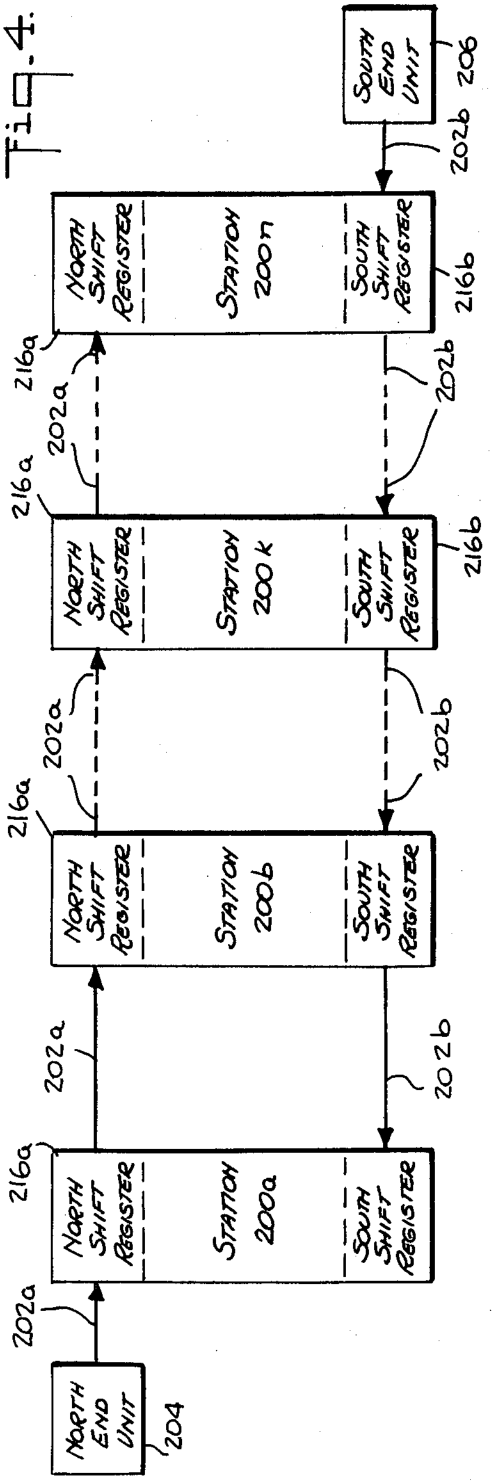
FIG. 4 shows a general block diagram of the system illustrating the station interconnections according to one embodiment of the invention.

Referring to FIG. 4, there is shown a general block diagram of the station interconnections of a system according to the present invention. The system is constituted by a large number of terminals or stations 200, such as $2^n$, where $n$ is the number of station identification (SI) bits in a SIP, connected in a linear network formed by a communication line 202. The communication line 202 consists of two parallel paths, these being a single north line 202*a* and a single south line 202*b*. Each line 202*a* and *b* passes through each of the terminals 200. In this system, the north line 202*a* begins at a north end unit 204 and ends at the station 200*n*. Similarly, the south line 202*b* begins at the south end unit 206 and ends at the station 200*a* at the other end of the line 202. Of course, it is to be understood that any number of stations 200 other than that number shown in FIG. 4 can be connected together to meet the requirements of a given system. The north path of the system shown in FIG. 4 includes the north end unit 204, north shift registers 216*a* of all the n stations and the north communications lines 202*a* connecting these elements in series. Similarly, the south path includes the south end unit 206, the south shift registers 216*b* of all the n stations, and the south communications line connecting these latter elements in series. Furthermore, the stations 200, with further modifications not shown, could instead be connected in a closed loop network configuration, now shown.

Figure 5:
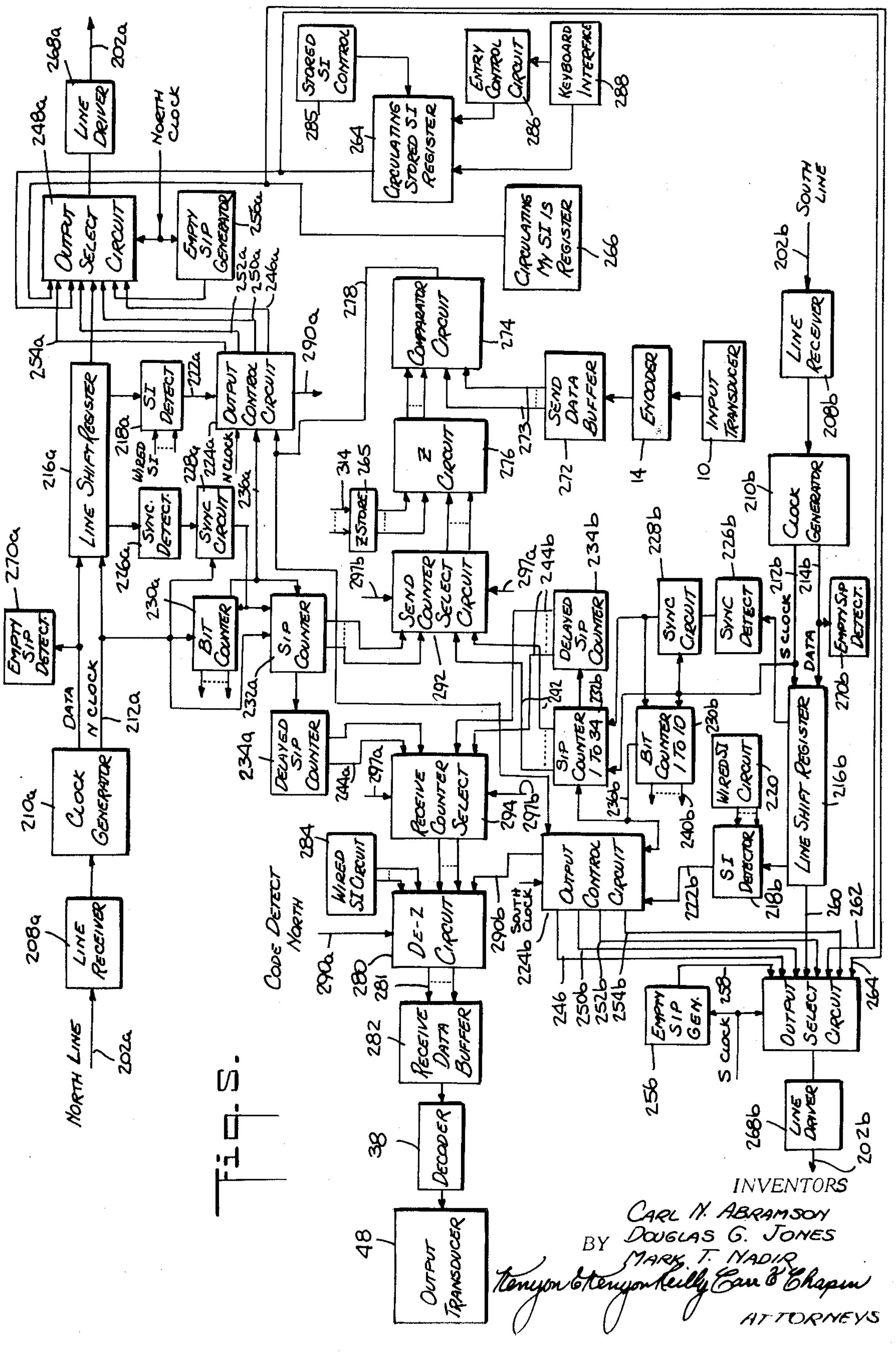
FIG. 5 shows a circuit block diagram of the transmit and receive circuitry of a single station within the system, including the interface circuitry between the encoder and transmit circuitry, and between the receive circuitry and the decoder.

Referring to FIG. 5, there is shown a general block diagram of the station or terminal 200. Generally, the station 200 comprises two substantially identical portions, which are interconnected together, these being a north portion associated with the north communications line 202*a* and a south portion associated with the south line 202*b*. Each portion of station 200 generally comprises a line receiver, line shift register, timing and counting circuits, detection circuits, data conversion and storage circuits, and a line transmitter.

More specifically, each portion of the station 200 comprises a line receiver 208 for receiving the data from the line 202 and converting the incoming data to an acceptable logic level. The line receiver 208 performs the function of direct current isolation in that it isolates the sending ground of the received data (the circuit ground of the adjacent terminal 200 from which the data was last sent) from the ground of the receiving station so that the receiving station 200 operates with its own terminal ground. In the system shown, the line data comprises digital information being received at a 25 megabit rate. As mentioned previously, since each SIP comprises 10 bits, the incoming data is received at a 2.5 megasip rate. It is noted that while the line data consists of digital pulses, any modulation system might also be employed. In this latter case, the line receiver 208 would perform the additional function of converting the diphase signals to digital logic signals.

Data received on the north line 202*a* will, if not removed by the station 200 as it passes through the shift register 216*a*, continue along the north line 202*a* to stations along such line. However, where a station receives data on north line 202*a*, such station will respond on south line 202*b*. It is to be understood that the subscript numerals *a* and *b* shown in FIG. 5 refer respectively to identical circuits which are associated with the north and south portions of the stations 200. For example, the line receiver 208*a* is associated with data received on the line 202*a* whereas the line receiver 208*b* is associated with data received on line 202*b*. For purposes of this discussion, where the circuits are referred to without the subscript *a* or *b*, it is to be understood that the description is generally applicable to the circuits located in both portions of the station 200.

The digital logic signals from the line receiver 208 are applied to a clock generator 210 which generally derives its own internal clock from the received data. Here, the frequency of the derived clock is set to match the incoming data in both frequency and phase. The clock generator 210 generally comprises an oscillator and a phasing logic circuit, not shown, connected to receive the incoming line data signals and provide an output clock signal in both phase and frequency synchronism with the incoming data signal. The derived clock signal is provided on output lines 212 from the clock generator 210. The data signal is provided on an output line 214 from the clock generator 210.

It is noted that the figures shown are only schematic representations, and the actual circuits may contain components, not shown, used for synchronizing the time of arrival of pulses and to allow adequate time for signal processing.

The line shift register 216 receives the incoming binary data on line 214. Essentially, the line shift register 216 includes a ten-stage flip-flop circuit for receiving the data in serial fashion. The incoming data is shifted in the flip-flop circuit by the derived clock signals on line 212. When a complete 10 bit SI is located in the shift register 216, a SI detector 218 decodes the data in the shift register 216 to determine whether the data entered is intended for receipt by its associated terminal 200. In this connection, there is provided a wired SI circuit 220 containing circuits representing the ten bit SI code of its associated station 200. Since the communication technique of this system includes the sending of code numbers corresponding to sample data by insertion of a SI code identifying the receiving stations into appropriate subperiods, the wired SI circuit 220 contains the SI of its associated station. Consequently, the SI detector 218 comprises gates for comparing the wired SI from circuit 220 with the data in the line shift register 216. The SI detector 218 is gated at the last or 10th bit time by an output-control circuit 224 so that the shift register is observed only when a complete SIP is entered. When a match occurs, the SI detector 218 provides a SI detect signal on line 222 which is gated at the output-control circuit 224. This SI detect signal 222 is used in the output-control circuit 224 to provide a code detect signal, to be later described, which alerts the station 200 that the data in the shift register 216 is intended for such station, and to enable the terminal to receive the derived voice data meaning in its buffers.

Each station 200 is provided with timing and counting circuits for tracking the incoming information to determine its appropriate SIP position in the period (P) as well as its appropriate bit position within a SIP. These circuits are important for decoding received information as well as for sending information on the line in the correct SIP positions. For example, at certain times or SIP counts the SI of a receiving station will be entered onto the line 202. However, the particular SIP count at which this entry occurs is critical since the voice sample is determined by the particular text SIP into which the SI appears. For instance, if the fifteenth text SIP is correlated with a code number representing the fifteenth discrete voice level in a station's voice circuit, then the appearance of the SI signal in the fifteenth SIP will be converted by the receiving station to a voice sample characteristic of the fifteenth voice level. With such point in mind, it becomes apparent that the entry of a SI onto the line can be made only at the particular SIP count within a period (P) representing the particular voice level to be transmitted. The timing and counting circuits include a sync detector 226, a sync circuit 228, a bit counter 230, a SIP counter 232 and a delayed SIP counter 234.

The SIP number 133 of the period (P) has been designated the SOPI SIP for use in sending the sync code. The sync code employed by this system comprises ten bits having a preselected pattern 0010110100. The sync detector 226 includes gate circuits for detecting the sync code from the incoming data and indicating such detection to the sync circuit 228. The sync circuit 228 also includes circuitry for keeping track of the number and frequency of occurrance of the sync signals received on the line and for detecting a loss of sync condition. If the sync has been lost, the sync detector 226 will monitor the line 202 for the sync code. Upon detection of sync code, the sync circuit 228 will provide a reset signal on line 238 for the bit counter 230 and SIP counter 232.

The bit and SIP counters 230 and 232 consist of counter circuitry driven by the derived clock signals on line 212 coming from the clock generator 210. The bit counter 230 includes a ten bit counter adapted to produce an output SIP signal on line 236 at every 10 bit interval. The bit counter 230 receives its initial timing from the sync circuit 228 and, accordingly, can be reset by such circuit via reset line 238. Also, the bit counter 230 provides several timing lines 240 connected to various stages of the timing and counting circuits within the system so as to produce output signals on lines 240 at each bit interval in the ten bit SIP including the tenth bit signal on line 236.

The SIP signal on line 236 is applied to the SIP counter 232 which includes an eight stage counter connected to count from 1 to 134 for the counts corresponding to the 0 through 133 SIP counts. The SIP counter 232 is advanced by one count by each SIP signal received on line 236. As noted previously, the period (P) is designed so that the 0 through 127 numbered SIPs comprise the text SIP corresponding to 128 different voice levels or characteristics. SIPs 128 through 131, respectively, are designated as REQUEST FOR SERVICE, ACKNOWLEDGE, MY SI IS and TERMINATE, respectively. SIP 132 is assigned for BOXING and SIP 133 is the SOPI SIP for transmitting the sync. The text SIP counts appear on the output lines 242. Special control lines, not shown, extend out of the SIP counter 232 to other circuits in the station 200 for individually indicating the occurrance of the SIP counts 128 through 133.

The SIP count binary output on lines 242 is used throughout the system to provide SIP timing or inserting data at the appropriate counts onto the communications line 202. In addition, the SIP counts are used in the receiving circuits of the station 200 to permit determination of the particular SIP count in which incoming data is received. In this connection, the delayed SIP counter 234 operates off of the SIP counter 232 to provide SIP count signals on lines 244 for use by the receiving circuits of the terminal 200. Delayed SIP counter 234 is essentially identical to the SIP counter 232 except that the SIP count output is delayed by an appropriate number of counts for purposes of synchronizing the time of arrival of the pulses with the transmittal time of the pulses.

The procedure for entering data into its appropriate SIP position in the period (P) is designed to permit maximum use of the SIP subperiods while at the same time avoiding an overwrite or race condition which might result in loss of useful data. If, for example, a subscriber station has read out information from the line shift register 216 but such subscriber does not have anything to send in that particular SIP at that time, then the output control circuit 224 provides an EMPTY SIP ENABLE signal on line 246 leading into an output select circuit 248. Generally, the output control circuit 224 generates control enable signals which are applied to the output select circuit 248 for purposes of enabling, or selecting, which data will be entered by the output select circuit 248 onto the communications line 202. In addition to providing an EMPTY SIP ENABLE signal on line 246, the output control circuit 224 provides a LINE RECEIVE REGISTER ENABLE signal on line 250, a STORED SI REGISTER ENABLE signal on line 252, and MY SI IS REGISTER ENABLE signal on line 254. The EMPTY SIP ENABLE signal on line 246 is generated after SIP data is removed from the communications line. The LINE RECEIVE REGISTER ENABLE signal is generated on line 250 in any cases where data is passing through the line shift register 216 but have not been received and used by the station 200. In this case, the data in the line shift register 216 will be permitted or enabled to pass through the station 200 unaltered. The STORED SI REGISTER ENABLE signal is generated on line 252 only when an empty SIP has been detected and data, in the form of the SI of an intended receiving station, is to be entered into the SIP position. It is pointed out that there are two conditions which must be met before a stored SI is sent in a SIP on a given communications line **202*a* or 202*b*. The first of these conditions is that there exists a voice character (code number) for the SIP to send. The second of these conditions is that the SIP position in the period (P) corresponding to the code number is empty. The MY SI IS REGISTER ENABLE signal is provided on line 254** during the beginning of the HANDSHAKING sequence in which the originator station sends in the 130th SIP his own SI for receipt by the receptor station.

The ENABLE signal on line 246, 250, 252 and 254, respectively, are gated together with their corresponding register circuits in the output select circuit 248. Specifically, the EMPTY SIP ENABLE signal on line 246 is gated together with a code provided by an EMPTY SIP generator 256 on line 258. The EMPTY SIP generator 256 provides a pre-arranged code (1,0,1,0,1,0,1,0,1,0,) assigned to designate an EMPTY SIP. The LINE RECEIVE REGISTER ENABLE signal on line 250 is gated together with the line data passing through the line shift register 216 on line 260. The data passing on line 260 includes the sync signals, the BOXING signals, EMPTY SIPs which were received by the line shift register 216 as EMPTY SIPs, and other text or control passing through the register 216. The STORED SI REGISTER ENABLE signal on line 252 is gated together with the SI signal provided on output line 262 and stores the SI of the remote subscriber presently communicating with a given subscriber terminal. The MY SI IS REGISTER ENABLE signal on line 254 is gated together with the signal provided on output line 264 by a MY SI IS register 266. It is noted that the MY SI IS signal is sent only by an originator station and is used only during HANDSHAKING. The MY SI IS signal is not sent by the receptor station since such receptor's SI is already known by the originator station. The output select circuit 246 passes the enabled register signals to a line driver circuit 268. Driver circuit 268 provides high current signals at an empedance matched to the line impedance.

It is to be noted that the derived clock signal provides a continuous shift in the line shift register 216 by means of its connection to each of the register flip-flops. It is also to be noted that the actual electronic circuitry in the line shift register 216 and its operation are conventional and within the state of the art and, therefore, are not detailed herein.

The procedure for entering data onto the communications line 202 is designed to permit maximum use of the SIP subperiods while at the same time avoiding an overwrite or race condition. If, for example, a station has read out information from the line shift register 216, then signals representing the "empty sip" code will be automatically written into that SIP position to indicate that such registers are empty and available for use by another station. In this manner, this empty SIP will be available to the station operating from the next station 200 physically located along the transmission line 202, and so on down the line 202.

It will be understood that in a system operating in accordance with the principles of this invention, numerous sending stations will be "competing" to place SI in each of the 128 text subperiods. In other words, the situation is that all sending subscriber stations seeking to place SI in a particular text SIP, as for example $SIP_8$, must await their opportunity to put their SI into a particular data SIP and if that particular data SIP is already in use, they cannot use it and must try that data SIP again on the next or succeeding periods(P).

It is known that in ordinary voice communication some amplitudes or ranges of the analog electrical signal of acoustic energy occur with far greater frequency than others. This necessarily means that in a system in accordance with the principles of the invention, the corresponding subperiods $SIP_0$ to $SIP_{127}$ will be used more or less frequently depending on their numerical data meaning. It also necessarily means that some SIPs will be in greater demand by subscribers compared to others and that, consequently, some stations attempting to convey the frequently used voice sample levels must wait for several periods (P) to pass because of the high demand for the corresponding SIP, while the SIP for an infrequently used voice sample level is passing unused. By employing a more even distribution of the demands on all data SIP, a great improvement in the use of available time would result. In other words, for example, if an excessive demand load on the time allocated to the SIP for the code number corresponding to voice level "64" could be shifted in position to the count allocated to the SIP for the relatively infrequently used voice level "5", the load on the SIP for the voice level "64" would be satisfied much faster without prejudice to demands on the SIP for the voice level "5." If shifting can be carried out in such a way that all SIPs are used and none unused as time proceeds through the various periods (P) and their data subperiods $SIP_0$ to $SIP_{127}$, the system will be more efficient in use of available time.

This invention, by use of the Z number, is effective to provide very high efficiency in the use of the subperiods.

Basically, the function of the Z number is to shift the signaled SI by a fixed number of SIP at the sending terminal and shift the SI back by the same number of SIP at the receiving terminal so that the SIP voice level is restored for interpretation by circuits in the receiving terminal. In the present embodiment, the Z number employed between two given communicating stations is the SI number of the one station which is receiving the data at any given time. In this connection, it is noted that a station will be alternately sending and receiving data. Here, a sending station sends voice data in those SIPs corresponding to the voice level samples, but shifted in SIP number by an amount determined by the SI number of the receiving station. Upon reception of data, in the form of SI signals in text SIPs, the receiving station shifts the SIP number by its own SI number so as to restore the SIP number to its original SIP number corresponding to the correct voice level sample. Alternately the Z number can be changed in some periodic pattern as by simple arithmetic permutation, or, more preferably, changed completely at random.

Generally, for sending voice data, the sending station 200 comprises a send data buffer 272 for storing the voice sample code number, a comparator circuit 274 and a Z circuit 276. The send data buffer 272 provides at its output terminal any one of 128 count numbers. These count numbers are correlated with the 128 voice levels being reproduced by the electrical circuitry of the system. As mentioned previously, the acoustic energy of the human voice is sampled at a high rate, such as 8,000 samples per second, and the analog value of each of the samples is converted to a digital code number which is stored in sequence in the buffer 272. The comparator circuit 274 compares the voice sample code number appearing on output lines 273 from buffer 272 with the binary data submitted by the Z circuit 276. When a match occurs, the comparator circuit 274 generates an enable signal on line 278 which is applied to the output control circuit 224 where such signal 278 produces a STORED SI REGISTER ENABLE 252. The latter signal 252 causes the stored SI to be entered onto the communications line 202 in the particular subperiod which was detected when the comparator circuit 274 observed a match.

As previously described, the basic purpose of the Z circuit 276 is to randomize the assigned text SIPs associated with the binary coded voice characters, so that stations having identical voice sample characteristics to transmit at substantially the same time in a given period (P) will be able to use perhaps all of the 128 text SIPs for transmitting such voice character. In this manner there is a possibility of any of 128 text SIPs being available in a period (P) for several stations as contrasted with the availability of only one particular SIP in the period (P) for a single voice sample characteristic. The Z circuit 276 transforms the SIP count number of the SiP counter 232 by an amount known as the Z number. In this system, since the Z number of a given station 200 is equal to the SI number stored in the CIRCULATING STORED SI REGISTER 264, the SIP count of the data detected in the line shift register 216 will be shifted by an amount determined by the SI number. Thus, the comparator circuit 274 actually sees the shifted or altered SIP count at the output lines of the Z circuit 276. Accordingly, in order that the original code number, and hence the original voice sample characteristic, be known at the receiving station, the detected SIP count of the subperiod having the received SI must be de-Zed or restored back to the original SIP count or code number. This operation is accomplished by the receiving station's DE–Z circuit 280 which operates with the original Z number on the received SIP count to produce the original SIP count or code number. This voice character code number is inserted into a receiving data buffer 282.

It is pointed out that since the sending station operated in its Z circuit 276 with a Z number derived from the SI of the receiving station, then the receiving station must operate with this same Z number in its DE–Z circuit 280. That is, the receiving station must use its own SI number as the Z number in its DE–Z circuit 280. This is accomplished simply by connecting a WIRED SI circuit 284 to the DE–Z circuit 280. The WIRED SI circuit 284 provides at its output lines the SI of its subscriber terminal 200.

The address (SI) of the subscriber originating a call is sent to the subscriber during the HANDSHAKING procedure between two such subscribers. In this embodiment, the Z number is derived from the SI. That is, the Z number is the seven least significant bits of the SI.

As mentioned previously, in this system the Z number has been chosen for each pair of communicating stations to be derived from the SI of the receiving station. During the HANDSHAKING procedure, the originating station sends the receiving station's SI in the 129th SIP. The receptor station will automatically detect his own SI in this SIP and, upon such detection, automatically reads the data in the 131st SIP to learn the SI or identity of the originator station. This is because the convention chosen is that the 131st SIP is reserved for MY SI IS which is defined as the SI of the originating station. As stated previously, the Z number for any pair of communicating stations is derived from the SI of the receiving station. The receptor station learns of the originator's SI by detecting the MY SI IS data in the 131st SIP during HANDSHAKING. This SI data is stored in the station's CIRCULATING STORES SI REGISTER 264. Register 264 is connected to a Z- store 265 which stores the seven least significant bits of the SI from register 264. These seven bits constitute the Z number.

At the receptor terminal, the MY SI IS signal detected in the 131st SIP is enabled by a stored SI control circuit 285 during the 131st STP time to permit the CIRCULATING STORED S1 REGISTER 264 to allow the SI in such SIP to be serially loaded into such REGISTER 264. By contrast, at the originator station, the CIRCULATING STORED SI REGISTER 264 is loaded in a different manner. Here, the originator station is initially aware of the receptor station's SI and simply dials the receptor station's SI directly into the CIRCULATING STORED SI REGISTER 264 by means of its keyboard interface circuit 288 and its entry control circuit 286.

The general theory of operation of the Z circuit 276 and the DE–Z circuit 280 involves the addition of an input binary character (a SIP count) to a second binary number (Z number) by a binary adding process which throws away any carry bits to obtain a new binary number (Z-ed).

This addition can be accomplished by an exclusive OR technique wherein a "0" plus a "1" provide a "1" output, and a "0" or a "1" plus a "1" provide a "0" output. If this sum (Z-ed number) is again added by the same process to the same Z number, then the resulting sum will be identical to the original number, (DE-Zed). For instance, where a SIP count binary number, such as the number 5 and represented in binary form as 101 is added to a Z number equal to 3, represented in binary form as 011, then the resultant binary number will equal 110, having dropped all carry bits. This Z-ed number might have the sixth SIP assigned to it when it is sent by the sending station. At the receiving station, when the Z-ed number 110 has the same Z number 011 added to it, the resultant character (DE-Zed number) will equal a binary number of 101 which is identical to the original binary number or character of 5 which was sent. This is the technique in which the Z-circuit 276 is employed to provide a Z-ed SIP number voice character for transmission to the receiving station and then to transform or DE–Z this character back to the original character (by using DE–Z circuit 280) for use by such receiving station.

In summary, a voice sample character is transmitted by a sending station by entering a code number corresponding to such voice sample character into the send data buffer 272. The output of the buffer is connected via lines 273 to the comparator circuit 278 which also receives a Z-ed SIP count of the SIP number in the line shift register 216. The SIP count of SIP counter 232 is altered by the Z number by means of the exclusive OR gating of the Z circuit 276. The resulting Z-ed SIP count will be compared with the code number output from the buffer 272. When a match occurs, the match signal 278 from comparator 274 will cause the output control circuit 224 to provide a STORED SI REGISTER ENABLE signal on line 252. This latter signal 252 enables the receiving station's SI, stored in the CIRCULATING STORED SI register 264, to be entered onto the line 202 by the output select circuit 248 into the appropriate SIP. When this incoming data is received at the receiving station, it is still the Z-ed character and therefore must be DE-Zed before it can be meaningful to the receiving station's terminal 200. Consequently, the Z-ed character, represented by the SIP count, is again added in DE–Z circuit 280 to the Z number derived in the wired SI circuit 284. To obtain the original voice character, the resultant original character (code number) leaving the DE–Z circuit 280 on lines 281 is applied to the receive data buffer 282 where it is processed in the Digital-to-Analog Decoder 38 and eventually used to reconstruct the original acoustic signal in the transducer 48.

Thus, the system shown in FIG. 5 illustrates how voice and other analog information are transmitted from one to another of a plurality of stations in the communications system. In summary, each of the code numbers corresponding to the sample characteristics is stored in sequence in the Send Data Buffer 272. Each of these code numbers is assigned to respective ones of the 128 discrete subperiods, or SIPs, with the correlation between such code numbers and SIPs being derived from the Z number stored in the Z-store 265. A voice sample characteristic is transmitted by inserting signals identifying the receiving stations on the transmission medium into the available subperiods having assigned meanings corresponding to the stored code numbers which in turn correspond to the transmitted voice sample characteristic. The system permits the stations to insert identification signals at indiscriminate rates on the transmission medium as determined by the availability of the subperiods having the proper voice sample message meaning associated therewith. Since the system capacity is distributed in the manner disclosed, the sending stations produce no over-lapping of data. In addition, during times of critical loading, the system does not close down or lock out completely to any station nor does the system require a station to wait until a large block of information can be transmitted by such station. Furthermore, the system indiscriminately accommodates different sampling rates used by the stations, and is insensitive to the kind of analog signals presented for transmission at the sending stations.

TIMING FOR NORTH AND SOUTH GOING LINES

As mentioned previously, each terminal 20 comprises two substantially identical portions respectively associated with the north line **202*a* and the south line 202*b*. The north portion 200*a*, hereinafter referred to as "north line," and the south going portion 200*b*, hereinafter referred to as "south line," of the terminal 200 have their own individual clocks which provide the proper timing for both loading and circulating of data within the station 200. Generally, after HANDSHAKING is completed, data received on north line 202*a* by line receiver 208*a* will pass through the line shift register 216*a* and, if not detected by the SI detector 218*a*, will proceed to be transmitted onto the north line 202*a* via the line driver circuit 268*a*. However, it will be gated into the station 200 by the clock generator 210*a* and will be received by such station if this data is detected by the SI detector 218*a*, in accordance with the north clock timing of clock generator 210*a*. In this situation, where a given station 200 is receiving data on the north line 202*a*, such terminal 200 will accordingly send data back to its communication station via the south line 302*b*. Therefore, the stored SI must be circulated in the CIRCULATING STORED SI register 264*b* with the south going timing provided by the south derived clock signal 212*b* from clock generator 210*b*. This means that the register 264*b*** must receive its timing from the south clock.

Data received on the north line **202*a* by line receiver 208*a* is detected by the SI detector 218*a* which provides an indication on output line 222*a* to the output control circuit 224*a*. In turn, the output control circuit 224*a* provides a CODE DETECT NORTH signal on line 290*a* which indicates to the station 200 that data has been received on north line 202*a* and, consequently, such signal 290*a* alerts the terminal that data must be sent out on the south line 202*b* using the south clock derived in clock generator 210*b*. The CODE DETECT NORTH signal on line 290*a* is used for many purposes. This signal 290*a* is connected to the DE–Z circuit 280 to enable data to be entered into the receive data buffer 282. The code detect signal 290, when produced during the 129th SIP, indicates a REQUEST FOR SERVICE to the station. When a REQUEST FOR SERVICE is detected, the proper (North or South) SIP counter is selected with which to both send data onto the line 202** as well as selecting the proper (South or North) SIP counter for receiving data from the line.

Figure 6:
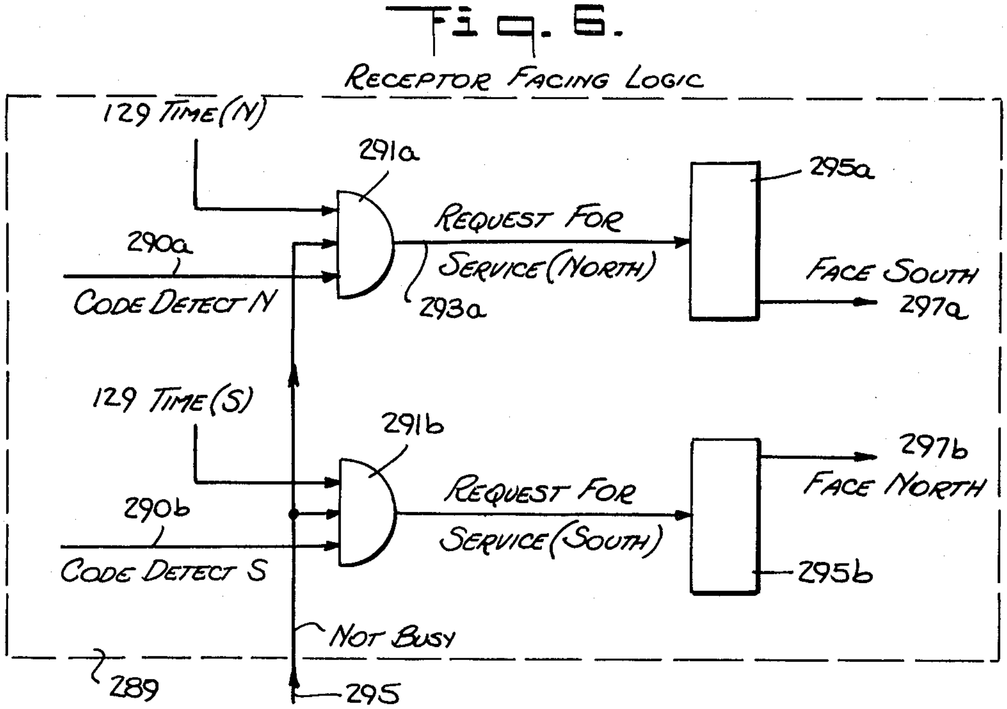
FIG. 6 shows a circuit block diagram of the receptor's logic circuits for selecting the north and south circuits.

A RECEPTOR FACING LOGIC CIRCUIT 289, shown in FIG. 6, is employed for selecting the proper counting circuits. More specifically, during the 129th SIP count, the code detect signal 290 is gated into a north or south gate **291*a* or b to respectively provide a REQUEST FOR SERVICE NORTH or SOUTH signal 293*a*** or *b*. This assumes that the terminal is not already in use, indicated by a NOT BUSY signal on line 295. The signals **293*a*** and *b*, respectively, are stored in flip-flops **295*a*** and *b*, the outputs of which are a FACE SOUTH signal **297*a* and FACE NORTH signal 297*b*, respectively. The FACE SOUTH signal 297*a* and the FACE NORTH signal 297*b* are applied to a SEND COUNTER SELECT CIRCUIT 292 to enable the proper SIP counter 232*a* or 232*b* to be used for sending data onto the line via the Z circuit 276 and the comparator circuit 274. In this example, since the signal on line 290*a* from the output control circuit 224*a* indicates the receipt of data on the north line 202***a*, the FACE SOUTH signal 297*a* is applied to the SEND COUNTER SELECT circuit 292 in a manner which permits the SIP counter 232*b*, associated with the south line 202*b*, to be gated through such circuit 292 for sending data onto the south line 202*b* to the station located in the south. Also, in the case where the REQUEST FOR SERVICE is received on north line 202*a*, the FACE SOUTH signal on line 297*a* is applied to a RECEIVE COUNTER SELECT circuit 294 which selects the north DELAYED SIP COUNTER 234*a* to be used for gating data into the receive data buffer 282. In this case, the FACE SOUTH signal on line 297*a* is used to select the north timing of the DELAYED SIP COUNTER 234*a* for gating the received data into the receive data buffer 282. In a similar manner, the RECEIVE COUNTER SELECT circuit 294 will gate the DELAYED SIP COUNTER 234*b* associated with the south line 202*b* when data is received on the south line, as a result of the FACE NORTH signal 297*b* which indicated that the incoming signals were detected on the south line 202*b*.

In summary, when a local station receives data on the north line 202*a* from remote station, the local station sends data back to the remote station by means of the south line 202*b*. Alternately, if data is received on the south line 202*b* from a remote station, then data will be sent back to such remote station via the north line 202*a*. In each case, the output control circuits 224*a* and 224*b* in the RECEPTOR FACING LOGIC CIRCUIT 289 to provide signals 297*a* and *b* which select the proper SIP counter timing for both loading incoming data into RECEIVE DATA BUFFER 282 as well as for sending data onto the lines 202*a* or 202*b* via the sending circuits.

It is noted that within each station 200 there are also provided north and south facing logic circuits for the originator station which operate to lock the direction of communications for each pair of communicating subscribers. During HANDSHAKING, the CIRCULATING STORED SI REGISTER 264*a* of the originator station is loaded with the receptor station's SI entered via the keyboard interface 288*a* and the entry control 286. At this time, a request for service is sent out in SIP number 128 on the north line 202*a*. If within a predetermined period of time, such as a few milliseconds, here is no response signal received by the originator, then the south clock of clock generator 210*b* automatically comes on to send a request for service on the south line 202*b*. In this manner, the north and south facing logic circuits operate to automatically lock the originator station 200 in the proper direction for communicating with a receptor station. At the receptor station, the clock generator 210 is operative during the 130th SIP count to gate the MY SI IS signals into the CIRCULATING STORED SI register 264 during the 130th SIP. Thereafter, the derived clock causes the register 264 to circulate in bit synchronism with the line data.

CIRCULATING STORED SI REGISTER

Figure 7:
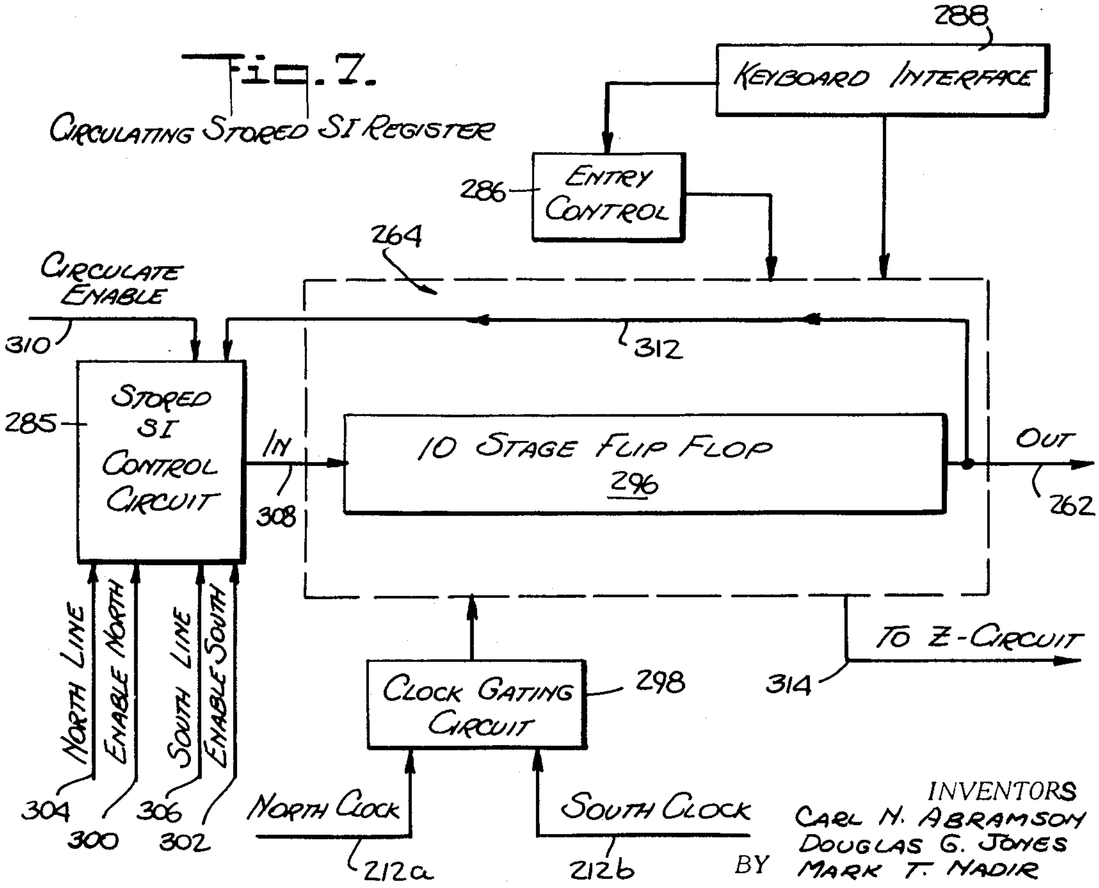
FIG. 7 shows a circuit block diagram of the circulating stored SI register employed by each of the stations.

This register 264, shown in FIGS. 5 and 7, circulates at a 25 megabit rate, the same rate as the line 202. Consequently, the register 264 when running, is always in synchronism with the line shift register 216, the MY SI IS register 266 and the empty SIP generator 256. Generally, the register 264 comprises a 10 bit flip-flop 296, with each flip-flop connected in series and the first and last flip-flops 296 circulating on each other via a line 298. Either the north or south derived clock signals on lines 212*a* and 212*b*, respectively, are used to circulate the register 264 via a clock gate 298. As mentioned previously, the SI of a remote station is entered into the register flip-flops 296 either through the entry control circuit 286 and the keyboard interface 288, or through the STORED SI CONTROL CIRCUIT 285, depending on whether the subscriber terminal 200 is an originator or a receptor of the call. A plurality of gates are located in logic circuits within the STORED SI CIRCUIT 285 and operate to permit the entry of the SI from the north line 202*a* or the south line 202*b*. More particularly, an ENABLE DATA NORTH signal appears on line 300 or an ENABLE DATA SOUTH signal appears on line 302 depending on whether the REQUEST FOR SERVICE and MY SI IS is received from the originator on the north line 202*a* or the south line 202*b*. The appropriate enable signal on line 300 or 302 will thereby enable the SI data to be received in the circulating stored SI register 264 via either a north line 304 or a south line 306. The SI is gated through the STORED SI CONTROL CIRCUIT 285 and onto the first flip-flop 296 via an output line 308.

During the MY SI IS time (130th SIP), the clock signals on lines 212*a* or 212*b* load the SI into the register flip-flops 296. After the MY SI IS is serially loaded into the register 264, both the north and south data enable signals on lines 300 and 302 are removed and a CIRCULATING ENABLE SIGNAL is provided on line 310 to enable a gate within the STORED SI CONTROL CIRCUIT 285 to close the register circuit loop via the line 312. The output line 262 from the last register flip-flop is connected to the output select circuit 248. As mentioned previously, the SI stored in the register 264 is used in the Z circuit 276. Accordingly, lines 314 from the register 264 are connected to the Z circuit 276 and provide the Z number for the station. When a station goes "on hook," all of the flip-flops 296 are reset so that they are in the proper state before receiving the SI data.

TRANSMIT AND RECEIVE BUFFERS

Figure 8:
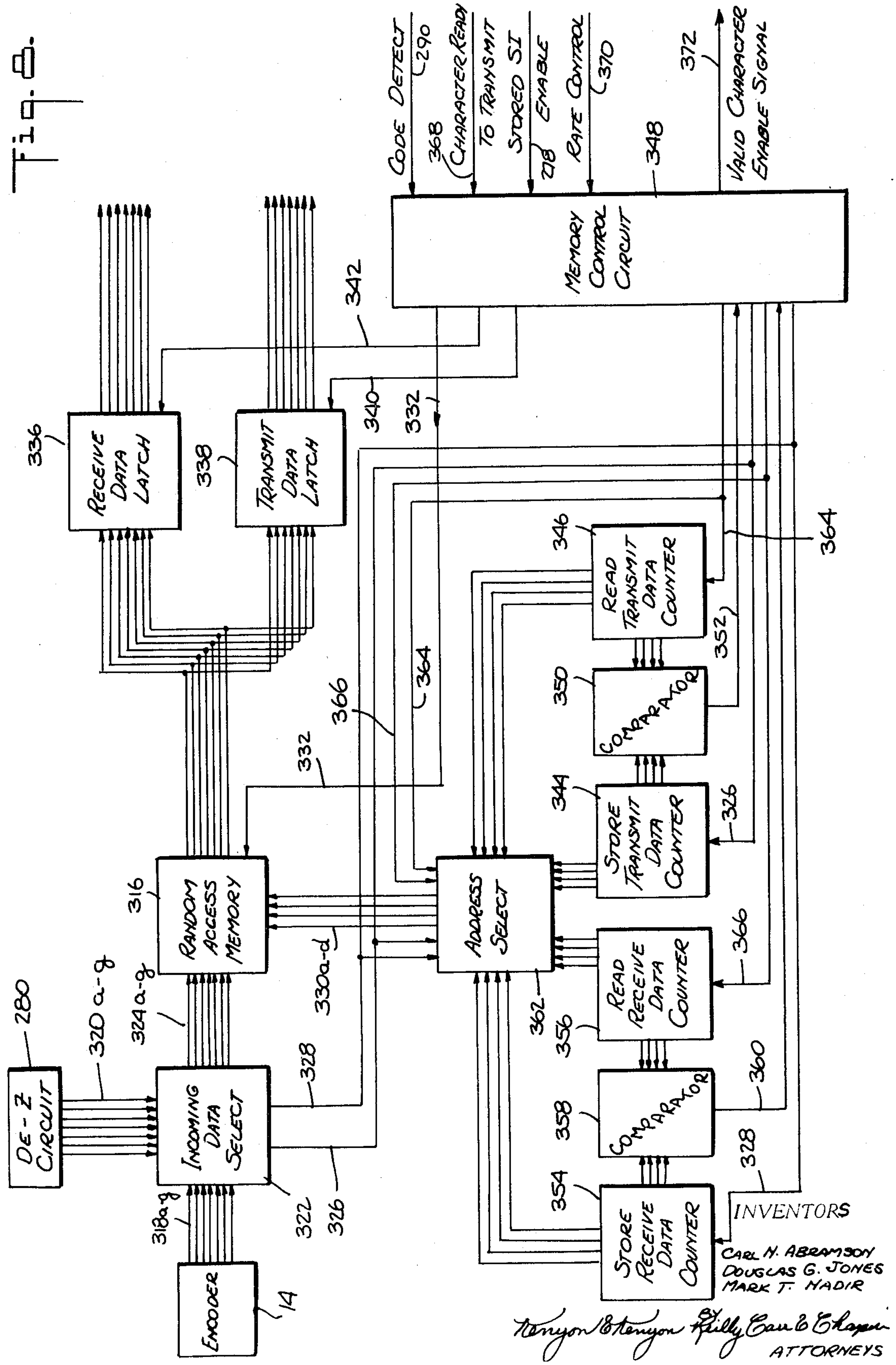
FIG. 8 shows a circuit block diagram of the transmit and receive buffers employed by each of the stations.

FIG. 8 shows in block form a preferred embodiment of the buffers wherein both the transmit and the receive storage functions are accomplished with a Random Access Memory 316. A first group of addressable storage locations within the Random Access Memory (RAM) 316, say eight locations numbered 0, 1, 2, 3, 4, 5, 6 and 7 is assigned to Transmit Buffer functions and a second group of addressable storage locations within the RAM, say eight locations numbered 8 through 15, is assigned to Receive Buffer functions. Each addressable location is capable of storing a complete digital code number sample (seven bits in this embodiment).

The 16 × 7 bit RAM 316 stores seven bit binary code numbers that have been generated for transmission by the Encoder 14 and it stores seven bit binary code numbers that have been derived from the incoming data on the transmission line. Code number samples generated by the Encoder 14 are received along lines 318 *a–g* and code numbers derived in the received circuitry (specifically the De-Z Circuit 280) are received along lines 320 *a–g*. It should be appreciated that both types of code number samples may arrive simultaneously or in an over-lapping time relationship. Therefore, an Incoming Data Select 322 channels data, one sample at a time, into the RAM 316 over lines 324 *a–g*. Incoming Data Select 322 channels lines 318 *a–g* through to the RAM 316 when there is a Store Transmit Data Enable signal on line 326 and channels lines 320 *a–g* through to the RAM when there is a Store Receive Data Enable signal on line 328.

Input-output address gates (not shown) in the RAM 316 are continuously responsive to the binary address signal on lines 330 *a–d* to limit input-output access to the particular memory location designated by the binary address signal.

The code number sample data in the memory location designated by the address signal on lines 330 *a–g* is unaffected by any incoming signals on lines 324 *a–g* until a Write Enable signal is present on line 332 at which time seven AND gates (not shown) channel the incoming data through to the designated memory location to replace any data in that location with the incoming data sample.

The code number sample data in the memory location designated by the address signal on lines 330 *a–d* is continuously detected on lines 334 *a–g* and applied simultaneously to a Receive Data Latch 336 and a Transmit Data Latch 338. However, Latches 336 and 338 are unaffected by signals on lines 334 *a–g* until enabled. The digital code number sample present on lines 334 *a–g* (which is the data in the RAM 316 storage location designated by the address signal on lines 330 *a–d*) is gated into Transmit Data Latch 338 when there is a Display Transmit Data Enable signal on line 340 and into Receive Data Latch 336 when there is a Display Receive Data Enable signal on line 342.

From the foregoing it is apparent that there are four possible memory operations, namely: (1) storing a received voice sample (code number) for later decoding; (2) storing a generated voice sample (code number) for later transmission; (3) taking a voice sample from storage for transmission; and (4) taking a received voice sample from storage for decoding into a speech waveform.

Generally, a separate counter is associated with each of these operations, the function of each being to keep track of the address of the next memory location to be used for the associated operation. The counters are adapted to produce the binary coded addresses associated with the memory locations available for that type of operation and to display these addresses one at a time in a fixed repeating sequence, charging to the next address in the sequence each time the associated operation is performed. In order to explain the operation of these counters, assume for example, that the RAM 316 locations numbered O, 1, 2, 3, 4, 5, 6 and 7 were previously assigned to Transmit Buffer functions, and that the Store Transmit Data Counter 344 and the Read Transmit Data Counter 346 count in binary form 0, 1, 2, 3, 4, 5, 6, 7, 0, 1, 2, 3, 4, 5, 6, 7, 0 and so on. The transmit counters 344 and 346 are not incrementing in phase, but rather the incrementing occurs when the associated function has been performed. In operation, the Read Transmit Data Counter 246 follows or lags behind the Store Transmit Data Counter 344. Counter 346 catches up to and equals Counter 344 when there is no stored data for transmission. When eight transmit samples are in the RAM 316, the Transmit Buffer portion is full and the address in Counter 346 again equals the address in Counter 344, but the Transmit Buffer portion of the RAM 316 is full rather than empty. To resolve this ambiguity, flip-flop type device (not shown) in a Memory Control Circuit 348 keeps track of or remembers which of the two above described transmit functions (storing or reading) was last performed. A four bit comparator 350 compares the output of Counter 344 with the output of Counter 346. The output 352 of the comparator 350 (indicating that the Transmit Buffer is either full or empty) is gated (not shown) with the above described flip-flop output to produce signals indicating that the Transmit Buffer portion of the RAM 316 is full, empty, or neither.

The Receive Buffer Counters function similarly. The Store Receive Data Counter 354 and the Read Receive Data Counter 356 count in binary form 8, 9, 10, 11, 12, 13, 14, 15, 8 and so on. The outputs of these counters are compared in Comparator 358, the output 360 of which is gated (not shown) in the Memory Control Circuit 348 with the output of a flip-flop device (not shown) that keeps track of or remembers whether the last Receive Buffer function was that of storing or reading of received data, so as to produce signals indicating that the Receive Buffer portion of the RAM 316 is full, empty, or neither.

The output addresses of Counters 344, 346, 354, and 356 are made available to an Address Select 362, the function of which is to select from the four available addresses, the address corresponding to the next to be performed RAM operation. Address Select 362 operates in a manner similar to the Incoming Data Select 322 except that there are four enables and four input sets of four bits each rather than two enables and two input sets of seven bits each. The count of the Store Transmit Data Counter 344 is channeled through to the RAM address input lines 330 *a–d* when there is a Store Transmit Data Enable signal on line 326; the count of the Read Transmit Data Counter 346 when there is a Read Transmit Data Enable signal on 364; the count of the Store Receive Data Counter 354 when there is an enable signal on line 328; and the count of the Read Receive Data Counter 356 when there is an enable signal on line 366.

It is noted that the enables on lines 326 and 328 for the Incoming Data Select 322 are also two of the enables for the Address Select 362, the ones corresponding respectively to the two alternative storing operations of the Incoming Data Select 322. That is, the Store Transmit Data Enable signal on line 326 simultaneously channels the Transmit Data sample on lines 318 *a–g* through to the data input of the RAM 316 and channels the count of the Store Transmit Data Counter 344 (indicating the next address to be used for storing a transmit data code number sample) through to the address inputs of the RAM 316. Thus, as soon as a Write Enable signal occurs on line 322, the input-output address gates of the RAM 316 are prepared to channel the code number data sample into the next address to be used for storing a transmit data sample. The Store Received Data operation functions identically.

A read operation also involves two steps. First, the count from either the Read Transmit Data Counter 346 or the Read Receive Data Counter 356 is channeled through the Address Select 362 with either a Read Transmit Data Enable signal on line 364 or a Read Received Data Enable signal on lines 366 in a manner which sets the address gates to the RAM 316 location having the desired data. The desired data information is detected automatically on lines 334 *a-g* and applied to the data inputs of the latches 336 and 338. Second, a Latch Enable signal is applied on either line 340 or line 342 to read the data into either the Transmit Data Latch 338 or the Receive Data Latch 336.

The Buffer Memory 316 is synchronized with the timing system for the transmission path bringing the Received Data. Four bit counts are selected within a given portion of each SIP subperiod, the first bit count serving to mark the point when the Memory Control Circuit 348 learns whether or not there is a received data sample to be stored (whether a SI was received in that SIP) and if not, which if any other operations have not yet been accomplished. The Memory Control Circuit 348 assigns a priority to each type of operation, always handling the Store Receive Data operation via lines 328 if it is requested by a Code Detect signal on line 290. If no Code Detect signal is received at the first bit count, the Memory Control Circuit 348 performs one of the other operations, if one has been requested at the first bit count. For convenience, the Memory Control Circuit 348 assigns priorities to the other operations as well, but proper system operation does not require any particular priority scheme.

When a Character Ready to Transmit command signal is received on line 368, the Memory Control Circuit 348 provides the Store Transmit Data Enable signal on line 326 to enable data for transmission to be entered at the proper address location in the RAM 316. Also, upon the Receipt of the Stored SI enable signal on line 278, the Memory Control Circuit 348 provides the enable signal on line 364 commanding the removal of data from the transmit address location of the RAM 316. In addition, the Memory Control Circuit 348 receives rate control signals on line 370. These rate control signals provide the rate timing at which data can be removed from the receive portion of the RAM 316, as well as the rate timing at which data can be entered into the transmit portion of the RAM 316.

Having decided at the first bit count, on a priority basis, which of the memory operation command signals on lines 290, 368, 278 and 370 will be performed during this SIP subperiod, if any, the Memory Control Circuit 348 sends the appropriate enable signal to the Address Select 362 (if it is a storing operation, the enable also goes to the Incoming Data Select 322) at the second bit count and holds the enable until the fourth bit count. At the third bit count, a Write Enable signal is sent on line 332 if it is a storing operation and a Latch Enable signal is sent on either line 340 or 342 if it is a read operation, either signal of which is also held until the fourth bit count. At the fourth bit count, the appropriate counter associated with this operation is incremented.

A Valid Character Enable signal is sent on line 372 when Transmit Data Latch 338 has been enabled and held until a Memory Operation Command signal is received on line 364. A Memory Operation Command Signal on line 364 indicates that the data in Latch 338 has been sent and that new data should be placed into such Latch from the RAM 316. If the Transmit Buffer is empty, the command signal on line 364 is disabled until the Empty Transmit Buffer condition ceases. If the Transmit Buffer portion is full, the Full Transmit Buffer signal previously described enables a gate that treats the Command signal on line 326 (which is the command signal generated when a coded sample is ready to be placed in the RAM) as if it were a command signal on line 364 (Latch 338 data sent).

The result is that the data in Latch 338 is lost when it becomes replaced by new data from the RAM 316 (the commanded operation). But the Transmit Buffer portion of the RAM no longer is full, the Full Transmit Buffer signal ceases, and the command signal on line 326 becomes a normal command to Store Transmit Data.

The functional result of the above operation is that a newly coded sample is not discarded when the Transmit Buffer portion is already full, but rather the oldest untransmitted coded sample is discarded to make room for storage of the newly sample. As will be appreciated, this situation only develops when the oldest coded sample has for some time been seeking transmission unsuccessfully, because the desired SIP was filled in each successive period (P). Discarding this oldest sample thus allows the second oldest and likely different sample to seek a different SIP resulting in elimination of the blockage caused by the oldest sample.

In the event the Receive Buffer portion is full when the next sample is received, the oldest character received is discarded in the same fashion as the oldest character in the Transmit Buffer portion is discarded in preference to the newest character. The likelihood of needing to discard a character in general increases with the loading (amount of usage) of the transmission path but may be made arbitrarily small at any specified loading by making the capacity of the buffers correspondingly large. The technique of discarding the oldest untransmitted sample code number in the buffer in order to make room for the most recently received sample code number can be descriptively described as DUMPING FROM THE BOTTOM of a buffer.

A flip-flop device in the Memory Control Circuit 348 detects whether a command on line 326 has been executed. When executed, the flip-flop device disables the command on line 326 so it will be twice executed. When the command on line 326 ceases, the flip-flop resets to allow passage through the gate of the next command on line 326. A similar flip-flop circuit is associated with each of the four memory operations to prevent double execution of commands. The Valid Character signal on line 372 indicates that the last command on line 364 has been executed.

END UNITS

Figure 9:
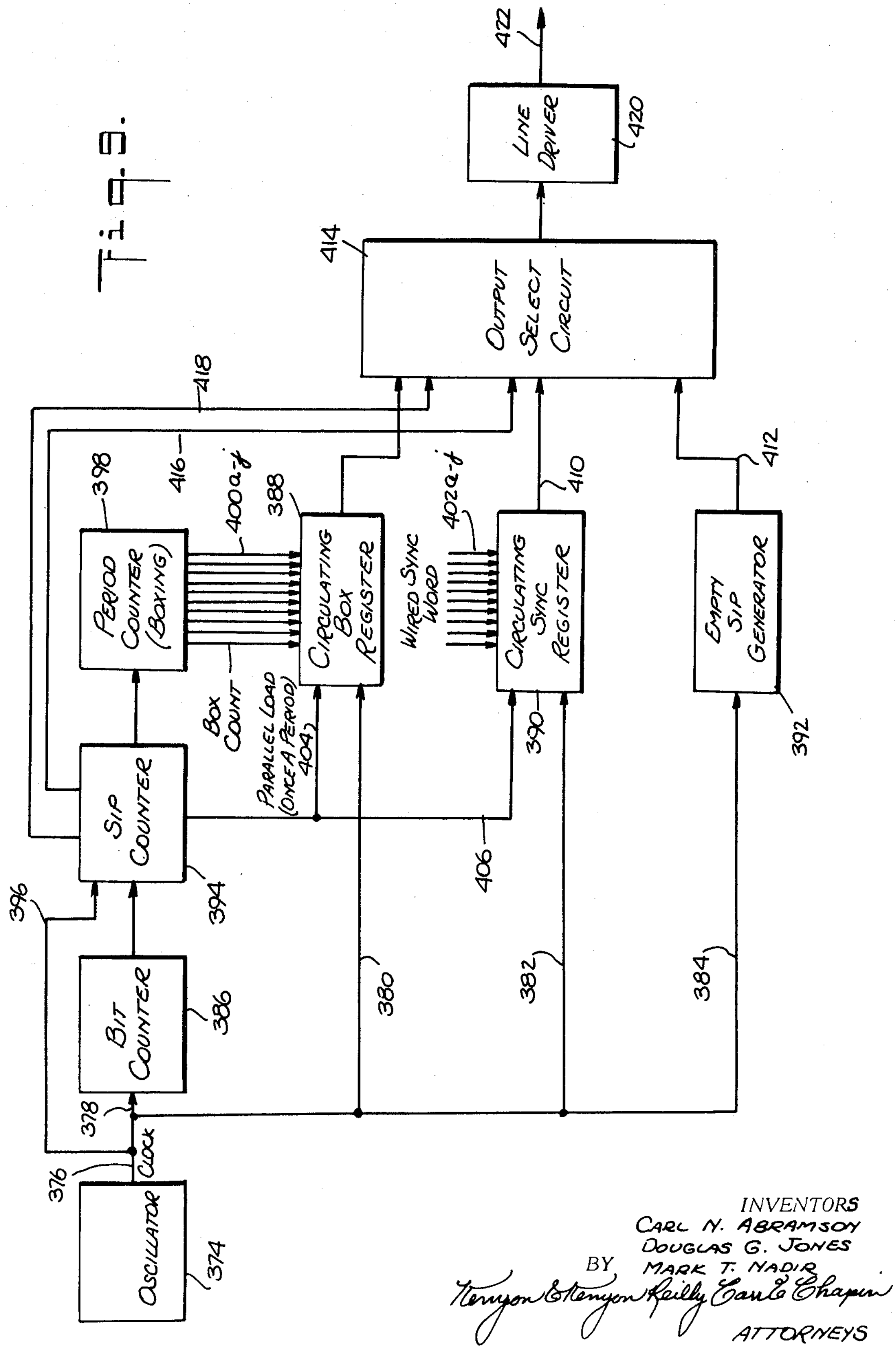
FIG. 9 shows a circuit block diagram of an end unit of the system.

Referring to FIG. 9, there is shown either of the End Units 204 or 206. Specifically, an oscillator 374 establishes the bit rate for a transmission path by generating on line 376 a periodic clock signal capable of simultaneously triggering over lines 378, 380, 382 and 384, a Bit Counter 386, Circulating Box Register 388, Circulating Sync Register 390, and Empty SIP Generator 392, at the desired bit rate.

Bit Counter 386 increments on each clock trigger and resets rather than increments after counting the number of triggers that comprise one SIP (10 bits equal one SIP in the present embodiment).

SIP Counter 394 is responsive to one of the bit counts of Bit Counter 386 to increment on the next clock trigger received on line 396 and to reset rather than increment after counting the number of SIPs comprising one period (134 SIPs equal one period in the present embodiment). SIP Counter 394 is incremented on a clock trigger rather than a count of Bit Counter 386 to eliminate any propagation delay through Bit Counter 386.

Period Counter 398 increments on a count (the BOXING INCREMENT COUNT) of SIP Counter 394 and resets rather than increments after counting the number of periods used for one boxing cycle. As will subsequently be apparent, any count of SIP counter 394 may be used for the BOXING INCREMENT COUNT except the BOXING COUNT and the LOADING COUNT. A separate boxing code corresponds to each distinct count of Period Counter 398. The associated boxing code is presented in parallel form on lines 400 *a–j* to the input gates of Circulating Box Register 388 during each period count of Period Counter 398. A detailed description of a system employing a BOXING operation is disclosed in the above-mentioned copending Patent application Ser. No. 48,096, filed on June 22, 1970, by Mark T. Nadir and Carl N. Abramson.

A wired Sync code is continuously applied in parallel form on lines 402 *a–j* to the input gates of Circulating Sync Register 390.

The input gates of Circulating Box Register 388 and the input gates of Circulating Sync Register 390 are responsive on lines 404 and 406 respectively to one of the SIP counters (the loading count) from SIP Counter 394 to load the boxing code and the wired sync code respectively into the registers. The Circulating Registers 388 and 390 are shifted on each clock trigger received on lines 380 and 392, respectively, thus repeatedly displaying at their respective outputs 408 and 410 the boxing and sync codes, respectively, in serial fashion. Empty SIP Generator 392 is responsive to the clock triggers on line 384 to serially generate an Empty SIP code on output line 412.

An output Select Circuit 414 is responsive to the boxing count and the sync count of SIP Counter 394 via lines 416 and 418 to gate through the Line Drivers 420 to the transmission path 422: the output 410 of Circulating Sync Register 390 during the boxing count; and the output 412 of the Empty SIP Generator 392 at all other times. The ordering and SIP count spacing between the boxing count and the sync count are determined by the ordering and spacing selected for these functions when setting up the meanings for the SIPs in the control portion of the Period (P).

The End Units 204 and 206 for the second transmission path is substantially identical to the End Unit described above for the first transmission path. As previously explained, the bit rates of the transmission paths need not be identical for precisely controlled. However, for maximum transmission efficiency, the bit rate should be maintained at the designed system maximum. In which case, Oscillator 374 of one end unit might be crystal controlled to the designed maximum rate while the other end unit might derive an identical bit rate from the end of the transmission path driven by the first end unit by using an oscillator that is frequency controlled by the first transmission path through a phase lock loop.

MULTI-STATION ADAPTERS

While the system shown and described with reference to FIG. 4 comprises a plurality of stations interconnected in a linear network formed by the communications line, it is to be understood that the present invention also contemplates the embodiment wherein one or more station adapters are connected in a linear network, with each adapter functioning to transfer data between a plurality of its associated stations and the communications line.

Figure 10:
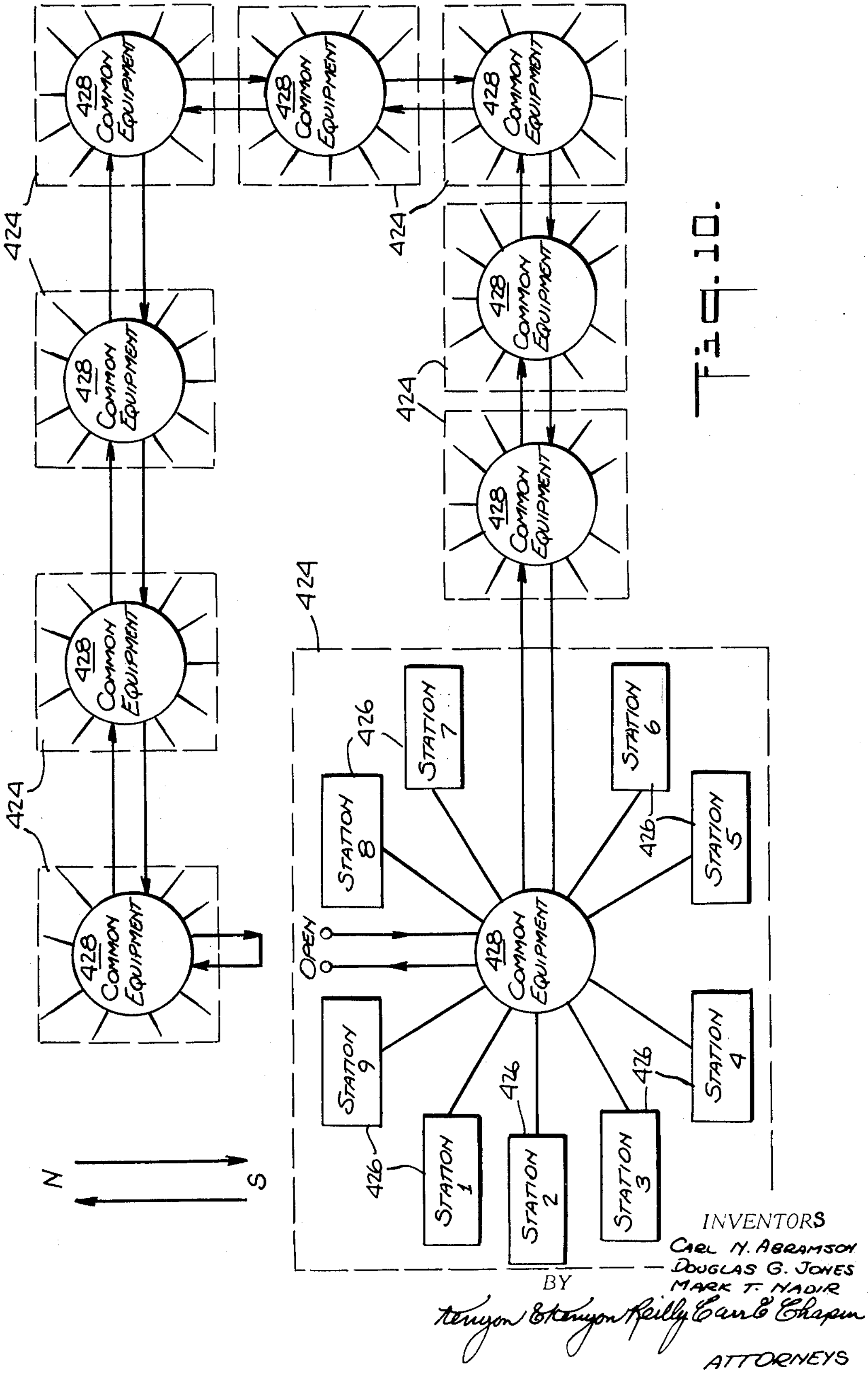
FIG. 10 shows another embodiment of the system wherein a plurality of adapters are connected in a linear network, with each adapter servicing several stations.
Figure 11:
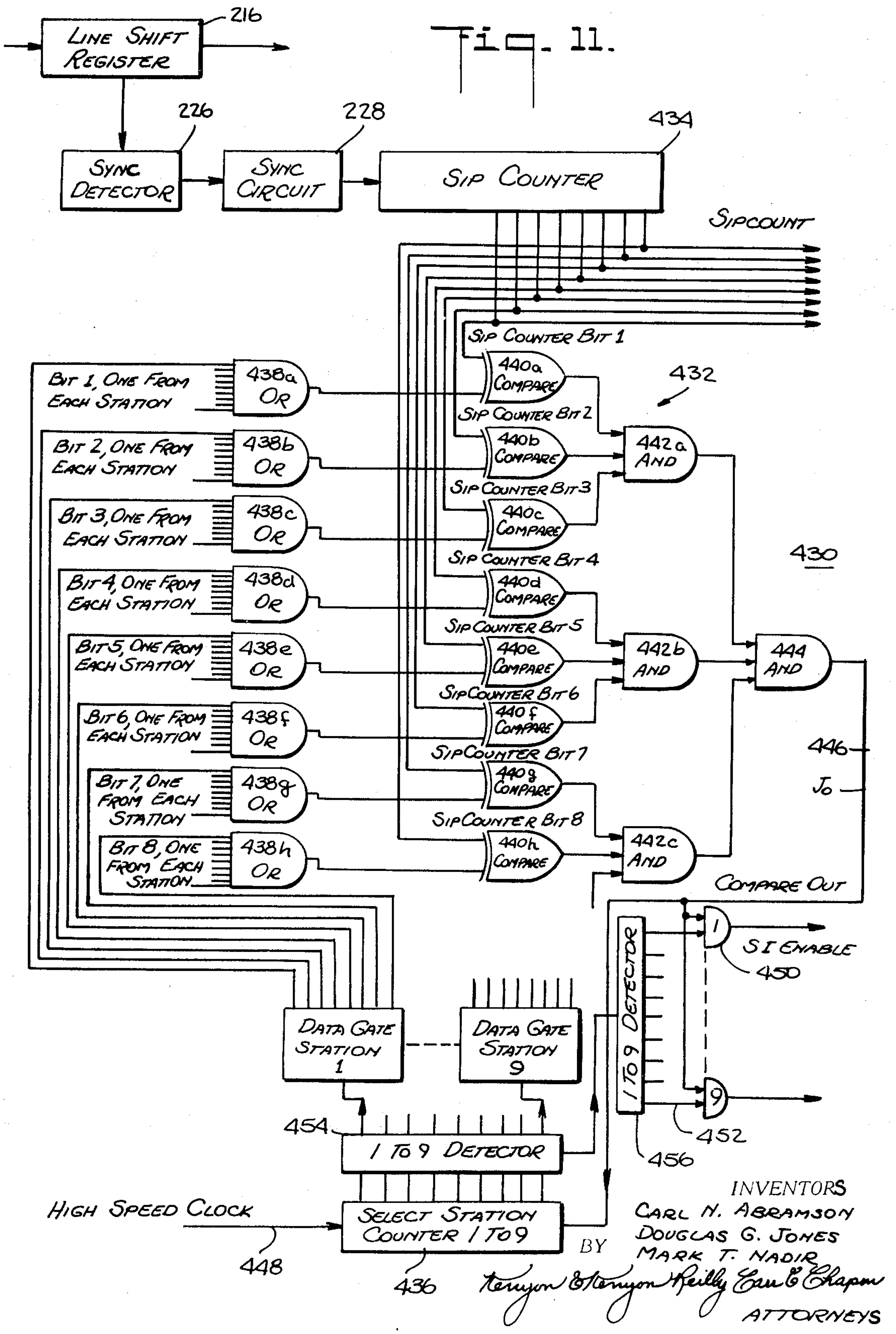
FIG. 11 shows a circuit block diagram of the station select mechanism included in the sending portion of each station adapter in the embodiment shown in FIG. 10.

More specifically, referring to FIGS. 10 and 11, the system is shown constituted by nine adapters 424 connected in a linear network. As indicated by the dotted line enclosures, each adapter 424 services nine stations 426 by means of Common Equipment 428. It is noted that end units, not shown, are provided in the system shown in FIG. 10. Such end units are similar to the end units 204 and 206 shown in FIG. 4. A Select Mechanism 430, shown in FIG. 11, is employed by the stations for transmitting information.

Referring again to FIG. 11, the Select Mechanism 430 consists essentially of a comparator 432, a SIP Counter 434 and a Select Station Counter 436. The timing and counting circuits, as well as the comparator circuits, operate in a manner similar to the sync circuit 228, but counter 230, SIP counter 232 and comparator circuit 274, shown in FIG. 5. The Select Station Counter 434 sequentially looks at the sample code number bits from each of the nine stations 426 that is in the send mode. Eight master comparator OR-gates 438 *a–h* are provided for each of the eight bits defining a single voice sample character. Since 128 text SIPs are provided, then each of the 128 text characters can be correlated with each of the 128 SIP counts. The eight bits in the SIP counter 434 are compared with the eight data bits coming out of gates 438 *a–h* from each of the nine stations by gates 440 *a–h* to produce a single pulse output through AND gates 442 *a,b,c* 444 to indicate when there is present a voice sample character to send in a particular SIP. The comparator 432 generates a signal on line 446 which stops the select station counter 436 thereby indicating which of the nine stations has this matched character. The select station counter 436 is driven via line 448 by a high speed clock on line 448 thereby enabling the select counter 436 to scan the nine station inputs at a very fast rate. When stopped, the select station counter 436 signals a SI Enable Gate 450 in the selected station equipment via one of lines 452. Detectors 454 and 456 include the detection mechanism for selecting which one of the stations has the matched character for sending and, consequently, provides the enable signal on the appropriate one of lines 452 to the SI Enable Gate 450 of the selected station.

Figure 12:
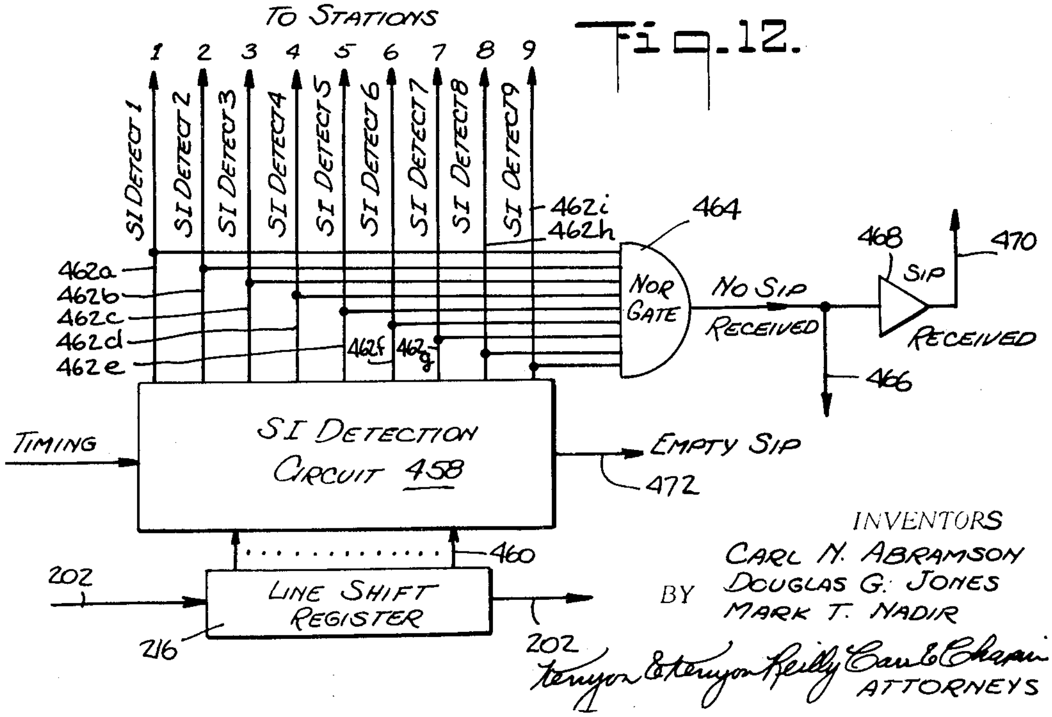
FIG. 12 shows a circuit block diagram of the SI detection circuitry included in the receiving portion of each station adapter in the embodiment shown in FIG. 10.

Referring to FIG. 12, there is shown the connections for the SI Detection Circuit 458 of the Common Equipment 428. The SI Detection Circuit 458 examines the SI in the Shift Register 216 to initially determine whether the incoming information should be directed to one of the nine stations associated with that particular adapter 424 and, secondly, to determine which of these nine stations should receive such information. To accomplish these functions, the decoder 458 detects the appropriate bits of the SI on lines 460 to determine the particular station, if any, to which the information is directed. The SI Detection Circuit 458 will generate a SI detect signal on one of lines 462 *a–i* when the station identification code of one of the associated stations is matched with the detected SI on line 460. The SI detect signal on one of lines 462 *a–i* is applied to the respective identified station and functions in a manner similar to the SI detect signal on line 222 on the system shown in FIG. 5. That is, the SI detect signal on line 222 is used in the output control circuit 224 to provide an identification code detect signal which informs the station that the data in the shift register 216 is intended for such station and thereby enables the station to receive the voice sample code number in its buffer. A NOR gate 464 is connected to receive inputs from all of the lines 462 *a–i*. If not one of the lines 462 *a–i* has a SI detect signal at a given time, No SIP Received signal will be provided on the output line 466 from the gate 464. Similarly, if a SI detect signal appears on one of the lines 462 *a–i*, an inverter 468, connected to the output of gate 464, will provide a SIP Received signal on its output line 470. The SI Detection Circuit 458 includes circuits for detecting and indicating on line 472 an empty SIP, similar to the Empty SIP Detect Circuit 270 of the system shown in FIG. 5.

Thus, the Multi-Station Adapter shown in FIGS. 10, 11 and 12 illustrate how voice an other analog information can be transmitted from one to another of a plurality of stations and station adapters in a communications system. The adapters permit a multiplicity of stations to transmit and receive data from a common point on the transmission medium. The use of discrete subperiods and individual sample data meanings assigned to the subperiods in the manner described above permits the several stations to insert station identification signals (SI) at indiscriminate rates on the transmission medium as determined by the availability of the subperiods having the requested voice sample message meanings associated therewith. Since the system capacity is distributed in a manner disclosed, the sending stations produce no overlapping of data, and the receiving stations can readily detect their own data. In addition, during times of critical loading, the system does not close down or lock out completely to any station nor does the system require a station to wait until a large block of information can be transmitted by such station. Furthermore, the system indiscriminately accommodates different sampling rates used the stations, and is insensitive to the kind of analog signals presented for transmission at the sending stations.

Although the above description is directed to preferred embodiments of the invention, it is noted that other variations and modifications will be apparent to those skilled in the art and, therefore, may be made without departing from the spirit and scope of the present disclosure.

What is claimed is:

1. Method of transferring voice and other analog information from one to another of a plurality of stations in a communications network, comprising the steps of:

at a sending station, successively sampling the voice or other analog signal for sets of values of one or more defining characteristics;

assigning said sets of values to ones of a multiplicity of distinct codes;

storing the codes corresponding to said sampled sets of values;

assigning each of said codes to respective ones of a multiplicity of discrete non-overlapping and adjacent subperiods within each of successive periods (P);

removing said stored codes from storage in the same order in which they were stored;

inserting into the available subperiods corresponding to said stored codes, signals identifying receiving or sending stations;

sending said identification signals along a transmission line;

at a receiving station, receiving and detecting said identification signals;

correlating the subperiods in which said identification signals are detected with their respective assigned codes;

storing said correlated codes;

removing said stored codes for storage in the same order in which they were received;

converting the stored codes to the sets of values assigned to said codes;

reconstructing the original voice or other analog signal from the derived sets of values.

2. Method as recited in claim 1, wherein said one or more defining characteristics of the analog signal is the amplitude thereof.

3. Method as recited in claim 1, wherein the time spacing between corresponding successive values of the one or more defining characteristics of the reconstructed analog signal is substantially the same as the time spacing between the successive samplings.

4. Method as recited in claim 1, wherein the successive sampling occurs at a uniform rate.

5. Method as recited in claim 1, wherein the rate of sampling the voice or other analog signal is changed from time to time in relation to the rate of change in the characteristic being sampled.

6. Method as recited in claim 5, wherein the voice or other analog signal is sampled for amplitude values defining said signal, and the rate of sampling is selected on the basis of the highest expected frequency component of said signal.

7. Method as recited in claim 5, wherein the sending station communicates the rate of sampling to the receiving station before said sending station transmits samples taken at the communicated sampling rate.

8. Method as recited in claim 1, wherein said sampling of the voice or other analog signal occurs at a uniform rate, and the codes corresponding to the sampled values are stored until subperiods corresponding to said stored codes are available for transmission.

9. Method as recited in claim 1, also comprising the step of indicating a reference point in each of the discrete periods for the stations to synchronize with the periods and to synchronously relate the occurrence of said discrete subperiods.

10. Method as recited in claim 9, also comprising counting numbers indicative of each of said discrete subperiods, the counting being repeated for each period (P).

11. Method as recited in claim 1, wherein the assignment of sets of values of characteristics defining the voice or analog signal to their respective codes is the same or different for each of the plurality of stations, the assignment of said sets of values being identical for those stations communicating with each other at a given time.

12. Method as recited in claim 1, wherein the identification signals are digital codes and the assignment of said sample codes to respective ones of a multiplicity of discrete, non-overlapping and adjacent subperiods is mathematically related to the digital identification code of the receiving station.

13. Method as recited in claim 1, wherein each sending station samples at a rate determined by the characteristics of the signal to be transmitted, independent of the sampling rates of the other stations in the system.

14. Method as recited in claim 13, wherein said sampling rate varies in accordance with the complexity of the voice or analog signal, and said sampling rate is employed by the receiving station to reconstruct the original voice or other analog signal.

15. Method as recited in claim 1, wherein sampling at a sending station is carried out at a uniform rate, reconstructing at the communicating receiving station is carried out at the same uniform rate, and inserting the identifying signals into the corresponding subperiods is carried out at indiscriminate rates depending on the availability on the transmission medium of discrete subperiods having meanings corresponding to the stored sample code numbers.

16. Method as recited in claim 1, including assigning a control portion of the period (P) for transferring encoding rate information between communicating stations.

17. Method as recited in claim 1, wherein said stations are interconnected in a linear network comprising two or more parallel transmission paths connected to each station.

18. Method as recited in claim 17, wherein at least two of said parallel transmission paths enable the transfer of signals in opposite directions along the network.

19. Method as recited in claim 17, wherein voice or analog signal communications between any two stations is preceded by a service request signal sent by the originating station along at least one of said transmission paths and a response signal is returned to said originating station by the receiving station.

20. Method as recited in claim 1, wherein the oldest stored sample code is correlated with any available one of its assigned subperiods, and when said oldest stored sample code is not correlated with an available one of its assigned subperiods and removed from storage before unused storage capacity is depleted, said oldest sample code is removed as if correlated when necessary to provide storage capacity for a new sample code.

21. Method of communicating an analog signal from one station to another station in a communications network, comprising:

at the sending station, sampling the amplitude characteristics of said analog signal at a uniform rate which enables reproduction of the analog signals;

assigning each sampled amplitude characteristic to respective ones of a multiple of discrete, non-overlapping and adjacent subperiods within a period (P);

inserting onto a transmission medium into the available subperiods corresponding to said sampled amplitudes, in the order in which said amplitudes are sampled, signals identifying receiving or sending stations, said insertions of identifying signals occurring at indiscriminate rates as determined by the availability of subperiods having proper sample amplitude assignments;

at the receiving end, receiving said identifying signals and detecting the occurrence of the subperiods in which said identifying signals are received;

correlating the so-detected subperiods with their assigned amplitude characteristics; and reconstructing the original analog signal from said derived amplitude characteristics by combining said derived amplitude samples together in the same order received and spaced apart by the uniform sampling period of the sending station.

22. Method of communicating an analog signal as recited in claim 21, further comprising, varying the assignment of said subperiods for each pair of communicating stations, whereby the assignment of said subperiods is randomized for all of the stations within the communications network.

23. System for transferring voice and other analog information from one to another of a plurality of stations in a communications network, comprising:

encoding means, at each sending station, for sampling the voice or other analog signal for sets of values of one or more defining characteristics;

sample transducing means, at each sending station, for correlating said sets of values to respective ones of a multiplicity of distinct codes;

means, at each sending station, for recognizing each of a multiplicity of discrete, non-overlapping and adjacent subperiods within each of successive subperiods;

assignment means, at each sending station, for assigning each of said codes to respective ones of said subperiods;

storage means, at each sending station, for storing the codes corresponding to said sampled sets of values in sequence, and for holding said sampled sets of values until subperiods corresponding to said held sets of values are available for transmission;

signal sending means, responsive to said storage means, for inserting into the available subperiods corresponding to said stored codes, signals identifying receiving or sending stations in a manner which removes said stored codes in sequence from said storage means;

means, at each receiving station, for receiving and detecting said identifying signals;

transducing means, at each receiving station, for correlating the subperiods in which said identifying signals are detected with their respective assigned codes;

storage means, at each receiving station, for storing said correlated codes; and decoding means, at each receiving station, for removing said stored codes in sequence from said storage means, converting said stored codes to the sets of values assigned thereto, and reconstructing the original voice or other analog signal from the derived sets of values.

24. System as recited in claim 23, wherein said encoding means includes a signal complexity detector for indicating the complexity of the voice or other analog signal, at a rate selector responsive to the output of said complexity detector for selecting an encoding rate.

25. System as recited in claim 24, including at each sending station, means responsive to said rate selector for controlling the rate of encoding said voice or other analog signal.

26. System as recited in claim 23, wherein a control portion of the period (P) is assigned for transferring encoding rate information between communicating stations.

27. System as recited in claim 23, wherein said encoding means includes an analog-to-digital converter which produces digital code numbers representative of the values of the sampled characteristics.

28. System as recited in claim 27, wherein said decoding means, at each receiving station, includes a digital-to-analog decoder.

29. System as recited in claim 23, including, at each station, means for altering the assignment of the sample codes to respective ones of said discrete subperiods so as to randomize the assignment of sample codes among the several stations.

30. System as recited in claim 23, including: counter means for the stations for producing count numbers indicative of each of said discrete subperiods, the counting being repeated for each period (P); and comparator means for comparing the subperiod count numbers with said codes stored in said storage means; whereby said signal sending means inserts said identifying signals into the available subperiods corresponding to said stored codes.

31. System as recited in claim 23, including one or more station adapters connected in said communications network for delivering signals to or receiving signals from the transmission medium to each of a plurality of stations connected to said adapters.

* * * * *